(12) United States Patent
Jensen et al.

(10) Patent No.: US 11,149,487 B2
(45) Date of Patent: Oct. 19, 2021

(54) GASKET AND SEALING SYSTEM FOR A VIG UNIT PRODUCTION

(71) Applicant: VKR HOLDING A/S, Hørsholm (DK)

(72) Inventors: Carsten Rud Jensen, Hørsholm (DK); Søren Vejling Andersen, Hørsholm (DK); Thibault De Rycke, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 170 days.

(21) Appl. No.: 16/614,812

(22) PCT Filed: Jun. 22, 2018

(86) PCT No.: PCT/DK2018/050163
§ 371 (c)(1),
(2) Date: Nov. 19, 2019

(87) PCT Pub. No.: WO2019/001670
PCT Pub. Date: Jan. 3, 2019

(65) Prior Publication Data
US 2020/0190891 A1    Jun. 18, 2020

(30) Foreign Application Priority Data
Jun. 29, 2017 (DK) .............................. PA201770511

(51) Int. Cl.
*E06B 3/673* (2006.01)
*E06B 3/66* (2006.01)
*E06B 3/677* (2006.01)

(52) U.S. Cl.
CPC .......... *E06B 3/6736* (2013.01); *E06B 3/6612* (2013.01); *E06B 3/677* (2013.01)

(58) Field of Classification Search
CPC ...... E06B 3/677; E06B 3/6736; E06B 3/6775; Y02B 80/22; Y02A 30/249
See application file for complete search history.

(56) References Cited

U.S. PATENT DOCUMENTS 6,676,786 B1 * 1/2004 Collins ................. E06B 3/6775
156/104
2006/0175767 A1    8/2006 Collins
(Continued)

FOREIGN PATENT DOCUMENTS

| JP | H06101763 A | 4/1994 |
|---|---|---|
| WO | 0029703 A1 | 5/2000 |
| WO | 0029704 A1 | 5/2000 |

OTHER PUBLICATIONS

International Search Report for corresponding application PCT/DK2018/050163 filed Jun. 22, 2018; dated Sep. 27, 2018.
(Continued)

*Primary Examiner* — Donald J Loney
(74) *Attorney, Agent, or Firm* — Cantor Colburn LLP

(57) ABSTRACT

The invention relates to a gasket for evacuation a void in a vacuum insulated glazing unit, a method for producing a vacuum insulated glazing unit, a gasket for use in the production of a vacuum insulated glazing unit and apparatus comprising an evacuation cup and a gasket. The present invention furthermore relates to the use of a gasket. The gasket is adapted for being positioned between the outer surface of the first pane and an evacuation cup, the evacuation cup comprising, a first cavity with a first cavity opening, an exhaust opening for evacuating the void via the first cavity opening, an evacuation cup body and one or more contact surfaces wherein the gasket is adapted to provide an air tight seal between the evacuation cup and the first glass pane during evacuation of the void, wherein the gasket comprises a gasket material which constitutes the majority of the gasket, is compressible between the evacuation cup and outer surface of the first pane with an out of plane (Continued)

module of elasticity below 50 GPa, such as below 30 GPa, such as below 25 GPa and has a melting temperature above 400 degrees Celsius.

20 Claims, 7 Drawing Sheets

(56) References Cited

U.S. PATENT DOCUMENTS

2008/0069983 A1\*  3/2008  Minaai .................. E06B 3/6612
                                                           428/34
2012/0148795 A1\*  6/2012  Kwon ...................... H01J 11/54
                                                           428/131

OTHER PUBLICATIONS

Written Opinion for corresponding application PCT/DK2018/050163 filed Jun. 22, 2018; dated Sep. 27, 2018.

\* cited by examiner

GASKET AND SEALING SYSTEM FOR A VIG UNIT PRODUCTION

The invention relates to a gasket for use in evacuation of a void in a vacuum insulated glazing unit, to the use of the gasket, to a method for producing a vacuum insulated glazing unit, and to an apparatus for evacuation of a void.

BACKGROUND

Vacuum insulated glazing (VIG) units comprise a compact sandwich structure having two glass panes with a vacuum void in between. The vacuum void provides enhanced thermal insulation and sound insulation resulting in an energy saving and comfort enhancing window pane. In the development of VIG units it is a continuous desire to provide a cost-effective manufacturing method and to obtain an optimized VIG unit having improved insulating properties and increased lifetime.

The VIG unit manufacturing method traditionally comprises the processes of assembling the VIG unit glazing unit by stacking the glass panes on top of each other face-to-face and sealing the periphery of the glazing unit using a side seal material, thereby creating an internal void accessed through an evacuation port in either one of the glass panes or in the side seal. A baking and evacuation process of thermally cleaning and evacuating the void within the VIG unit whereby impurities and contaminant are evacuated from the void via the evacuation opening and a low pressure near vacuum is created within the void. Upon evacuation the evacuation cup is forced towards the glass pane due to the low pressure created. The evacuation opening is sealed, such that the void is fully enclosed, and the VIG unit is cooled.

The void may be evacuated using a vacuum apparatus connected to a vacuum pump and adapted to be in fluid connecting with an interior cavity of an evacuation cup which in turn is in fluid connection with the evacuation opening of the VIG unit. A good contact between the cup and glass pane is important for the evacuation of the void and the desired quality of the vacuum to be created. Small gaps between the glass pane and the evacuation cup may exist, facilitating sideways leaks across the sealing surfaces in the vacuum apparatus and an inefficient evacuation of void. In order to provide better seal between the evacuation cup and the glass pane, a gasket can be used to prevent any leaks of gas between the outside of the VIG unit and the cavity of the evacuation cup.

WO 00/29703 discloses an aluminium foil gasket to be used in a VIG manufacturing method to compensate for slight glass pane deformations from planarity as the VIG unit is exposed to high temperatures during the manufacturing method. The gasket is used to provide a leak-free seal between the glass pane and the evacuation head and it is between 10-50 microns thick.

WO 00/29704 discloses an evacuation head comprising a first cavity and a second surrounding cavity. The second cavity contains a polymer O-ring that contacts the glass pane and when in use, seals against the surface of the glass pane.

US 2006/0175767 A1 describes a gasket for providing an efficient seal between an evacuation head and the glass pane. The gasket is described as being made of aluminium with surface grooves and with a point-to-point variation in thickness of the sealing surfaces of the gasket which is less than 1 micron. The grooves may be applied as a uniform groove pattern, having a groove height between 1-5 microns.

During the evacuation process it is advantageous to operate at high temperatures as impurities and contaminants from the frit materials and the glass panes thereby become increasingly released and evacuated from the interior of the VIG unit. But when using low melting point gasket materials, such as polymer-based gaskets it is increasingly challenging to obtain these high temperatures without compromising the sealing efficiency between the glass pane surface and the evacuation cup since the polymer material will melt at high temperatures and significantly increase the risk of leaks between the appointed surfaces to be sealed.

DESCRIPTION OF THE INVENTION

Disclosed herein is a gasket for use in the production of a vacuum insulated glazing unit, particularly in the apparatus. The present invention furthermore relates to the use of a gasket, an apparatus for evacuation a void in a vacuum insulated glazing unit and a method for producing a vacuum insulated glazing unit.

The present invention allows for a more cost-efficient evacuation process, as the properties of the gasket of the present invention provide a more efficient hermetic seal between contact surfaces of an evacuation cup and a tempered glass pane. Large height variations of the surfaces to be sealed may be filled by the soft gasket material, thereby eliminating any possible pathways across the sealing surfaces which otherwise would allow gas to leak between the interior and exterior of the evacuation cup. Furthermore the high melting point of the gasket material makes it stable across a large temperature range and particularly suitable for the VIG unit manufacture process, comprising high temperatures and large temperature variations. A good quality gasket seal improves the evacuation process within VIG unit manufacturing method and provides a high quality vacuum void in the resulting VIG unit.

The first aspect of the present invention relates to a gasket for use in evacuation of a void between two glass panes in the production of a vacuum insulated glazing unit, the vacuum insulated glazing unit comprising:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
wherein the gasket comprises a first sealing surface and a second sealing surface opposite the first sealing surface, wherein the gasket is adapted for being positioned between the outer surface of the first pane and an evacuation cup, the evacuation cup comprising:
  a first cavity with a first cavity opening,
  an exhaust opening for evacuating the void via the first cavity opening,
  an evacuation cup body surrounding the first cavity, and
  one or more contact surfaces including a first contact surface on the evacuation cup body enclosing the first cavity opening,
the evacuation cup being adapted for covering the evacuation opening in the first glass pane and a part of the outer surface on the first glass pane surrounding the evacuation opening,
wherein the gasket is configured to provide an air tight seal between the one or more contact surfaces of the evacuation cup and the first glass pane during evacuation of the void, with the first sealing surface of the gasket in direct contact with the one or more contact surfaces of the evacuation cup and the second sealing surface of the gasket in direct contact with the first glass pane,
wherein the gasket comprises a gasket material which:
  constitutes the majority of the gasket,
  is compressible between the evacuation cup and outer surface of the first pane with an out of plane module of elasticity below 50 GPa, such as below 30 GPa, or below 25 GPa and
  has a melting temperature above 400 degrees Celsius.

The flexibility of the gasket material preferably provides a gasket which is easy to shape and adapt to surfaces in abutment with the gasket and any departures from planarity within these surfaces such as the shape of the evacuation cup contact surfaces and especially the out-of-flatness of the tempered glass surface. This provides an efficient seal which in turn facilitates achieving a high level of vacuum. The relatively low module of elasticity of the gasket material, allows the gasket to deform to the surfaces to be sealed as the pressure within the cavity of the evacuation cup drops and the cup is forced towards the glass pane. The module of elasticity, also commonly referred to as young's modulus, is a measure of the resistance of deformation defined as ratio of stress to strain at room temperature. Specifically the compression module of elasticity measured by applying compressive stress to the material in an direction perpendicular to the gasket surface and measuring the resulting compression may preferably be below 25 GPa, preferably below 10 GPa or even below 5 GPa such as down to 0.001-2 GPa. In general, a low measure of the module of elasticity indicates a flexible material, such as rubbers or polymers which usually have a module of elasticity below 4 GPa i.e. about $0.58 \times 10^6$ Psi (1 GPa=145038 psi) for example polytetrafluoroethylene, nitrile rubber, fluorocarbon rubber or silicone. Metals usually have a much larger modulus of elasticity typically between 45-410 GPa, e.g. aluminium has a modulus of elasticity of approximately 70 GPa measured at room temperature.

In one or more aspects, the compression modulus of the gasket material expressed in percentage may be between 35%-45%, such as about 40% (DIN 28090-2) and additionally compressibility of the gasket may be between 30%-50% (ASTM F36A-66). Furthermore the gasket material may comprise a compressive strength between 70-280 MPa, such as 150 MPa.

In the present invention the gasket material has a melting temperature above 400 degrees Celsius, preferably above 450 degrees Celsius such as above 500 degrees Celsius or 550 degrees Celsius measured at atmospheric pressure. It is furthermore preferred that the gasket material has a very low vapour pressure at the manufacturing temperatures used. The present gasket is therefore particularly useful in VIG manufacturing processes operating at high temperatures, such as at temperatures around or above 400 degrees Celsius. The manufacturing temperatures may reach temperatures of and preferably also above 400 degrees Celsius without compromising the sealing efficiency of the gasket. This allows the VIG unit to be manufactured in a more cost-efficient way as the void may be heated to high thermal cleaning temperatures, facilitating efficient evacuation of impurities and a better quality of the resulting VIG unit.

The gasket material preferably comprises excellent sealing properties under different pressures used in the manufacture of the VIG unit such as from atmospheric to vacuum pressure. The pump may be connected to the exhaust opening using a tube or conduit. The pump is a vacuum pump of the type suitable for achieving pressures down to a pressure below 0.001 mbar, such as 0.0005 mbar or 0.0001 mbar, such as a turbo pump.

The gasket material constitutes the majority of the gasket. By the term majority is meant more than half of the gasket, but preferably more than 90% such as 95% or 99% of the gasket. In manufacturing the gasket, the manufacturing method is significantly simplified by minimizing the amount of gasket materials to be layered or mixed in creating the gasket. Furthermore, by reducing the amount of layers in turn reduces the amount of possible lateral leak pathways.

The second sealing surface is in direct contact with the first tempered glass pane, such that the gasket material may compensate for any irregularities in the planarity of the glass surface and eliminates leaks when squeezed between the evacuation cup and the glass pane. It is thereby not necessary that the gasket comprises a completely smooth surface in order to provide an efficient seal as the gasket material can deform to large surface variation, such as +/−0.3 mm, such as +/−0.2 mm, or such as +/−0.1 mm, of the abutting surfaces.

The evacuation cup may be adapted for covering the evacuation opening in the first glass pane and a part of the outer surface on the first glass pane surrounding the evacuation opening. In one or more aspect, the evacuation cup may be shaped as a cup, comprising a first cavity, enclosed by the cup walls and accessed through a first cavity opening. Preferably the first cavity opening is face-to-face with a portion of the first glass pane and the evacuation opening when the evacuation cup is arranged on the VIG unit. An exhaust opening in the evacuation cup wall is in fluid connection with the first cavity, and may be positioned anywhere in the evacuation cup wall. The one or more contact surfaces of the evacuation cup may preferably be planar and may be face-to-face with a portion of the glass plane surface when in use. The one or more contact surfaces may additionally be parallel to the first cavity opening, and additionally enclose the first cavity opening.

In one of more aspects, the spacers are made of a material having a high compressible strength, for example they may be made from metal, such as stainless steel, or glass, glass frit or ceramic, or a combination thereof. The spacer height determines the minimum distance between the inner surfaces of the tempered glass panes, and may preferably be between 0.1 and 0.4 mm in height, preferably around 0.2 mm in height. The spacer spacing may be between 20-50 mm, such as 40 mm.

The spacers may be of any shape sufficient for the spacers to function, such as cylinder, pyramid, conical, circular, rounded shape or a combination thereof. Furthermore the shape may be a complex shape manufactured using an aggregation of different or similar shapes.

The side sealing material may comprise a metal band for joining the periphery of the glass panes or it may mainly comprise a frit material. Preferably the frit material is in a paste form which can be readily applied peripherally on at least one of the glass panes.

In one or more aspect, the gasket material is graphite. The purity of the graphite material may be above 97%. In one or more aspect, the purity of the graphite material is above 99.5%. The material may be of the type characterised as flexible or expanded graphite. The expanded graphite may be produced by acid insertion in the graphite structure. The acid vaporizes and expands at high thermal shocks which in turn expand the graphite structure, creating expanded graphite. Expanded graphite has the unique physical properties of having a very high melting point and a very low out of plane modulus of elasticity, below 20 GPa (giga pascal) but typically below 10 GPa (ASTM standards C747, C769), down to modules of elasticities resembling the modules of elasticity of polymers or rubbers. The compression modulus of elasticity (the ratio of the out of plane compressive stress applied to a material compared to the resulting compression) of the graphite material may be around 0.01-5.00 GPa, such as 0.1-3.00 GPa at room temperature. The compression modulus expressed in percentage may be between 35%-45%, such as 40% (DIN 28090-2). Graphite is pressure and temperature stable with a melting point near 3500 degrees Celsius. The maximum operating temperature may be near 2500-3000 degrees Celsius in non-oxidizing conditions. The graphite material may preferably comprise physical properties such as density between 0.7 and 1.3 $g/cm^3$ (DIN 28090-2) and additionally a compressibility between 40% and 50% (ASTM F36A-66). Flexible graphite sheets comprise a compressive strength between 70-280 MPa. The material can be compacted to a large degree along the direction perpendicular to the gasket surface at which the gasket diameter may increase in size, instead of tearing or breaking due to the large loads.

At least an edge part of the gasket material may be exposed to vacuum pressure, and in addition the gasket material may also simultaneously be exposed to a temperature above 400 degrees Celsius. Advantageously, the graphite gasket material maintains its sealing integrity at temperatures above 400 degrees Celsius near vacuum pressure. Additionally, the gasket material is highly stable to during large temperature variations and thermal shocks.

In one or more aspect, second sealing surface comprises a coating layer. The second sealing surface relates to the gasket surface abutting the surface of the first glass pane, such that the gasket may compensate for any irregularities in the planarity of the glass surface and eliminates leaks when squeezed between the evacuation cup and the glass pane.

In one or more aspect, the first sealing surface comprises a coating layer. The first sealing surface relates to the gasket surface abutting the contact surface(s) of the evacuation cup, such that the gasket may compensate for any irregularities in the planarity of the contacts surfaces and eliminates leaks when squeezed between the evacuation cup and the glass pane.

In one of more aspects, one or both of the sealing surfaces of the gasket comprises a coating layer which may be made of silver (Ag), aluminium (Al), gold (Au), copper (Cu) or alloys, such as e.g. Zu-Cu alloys. Other feasible materials tungsten nitride (WN). The coating layer is preferably adapted to become soft and fill out any minor cracks or minor surface irregularities within the glass surface and thereby increase the overall sealing efficiency of the gasket. Preferably this is facilitated while the coating layer is exposed to the high temperatures of the VIG unit manufacture process, as it will result in a sufficient softened state of the coating layer which can flow and fill the cracks. The coating material preferably facilitates good adhesion to the surfaces to be sealed as well as low outgassing and low permeation during the manufacture of the VIG unit. The coating layer may be a multilayer. One or both sealing surfaces may comprise e.g. a first material in the lowermost layer providing a good adhesion to the gasket material, a second material at the middle layer comprising excellent sealing properties such as elasticity, and a third material in an uppermost layer protecting the gasket from deterioration such as oxidation or heat damage due to environmental effects.

In one of more aspects, at least the second sealing surface of the gasket comprises a coating layer comprising aluminium. Aluminium sufficiently softens during the VIG unit manufacturing process using temperatures lower than the melting point of Aluminium around 660 degrees Celsius. The aluminium may then flow into cracks and fills any irregularities in contact surfaces of the evacuation cup and the first glass pane surface. It is thereby not necessary that the gasket and the coating comprises a completely smooth surface in order to provide an efficient seal as the gasket material will deform to large surface variation, such as up to +1-0.3 mm, of the abutting surfaces while the aluminium layer will fill any micro-cracks present. In one or more aspect, the first sealing surface also comprises a coating layer comprising aluminium.

In one or more aspects, the aluminium layer is deposited onto the graphite surface(s) by means of vapour deposition, such as by thermal evaporation. The coating layer may be deposited using physical (PVD) or chemical vapour deposition (CVD), such as magnetron sputtering, atomic-layer deposition, e-beam evaporation, sputter deposition, Plasma-Enhanced chemical vapour deposition (PECVD) and deposition by pyrolysis, condensation, dip-coating or the like. It is preferred that the coating layer is deposited by a method producing a good adhesion of the coating layer to the surface(s) of the gasket material. The deposition may be undertaken using one or several deposition methods and the deposited layer may be a multilayer.

In one or more aspects the aluminium coating layer is doped with silicon, e.g. 10 wt % silicon. Doping the coating layer with silicon up to concentrations of approximately 12 wt % of silicon within the coating layer will result in a decrease in the melting point temperature of the Al—Si coating layer. Within this range of Si concentrations the melting point temperature will decrease with increased amounts of Si. At around 12 wt % of Si, the resulting melting point temperature of the coating layer will be around 577 degrees Celsius. That is around 80 degrees less than pure aluminium (Al). The doped Al layer will thereby be more readily softened at the VIG manufacturing temperatures used, such as around 400 degrees Celsius.

In one or more aspects, the coating layer(s) has a thickness below 5 microns, preferably between 0.05-3.0 microns, such as approximately 0.2 micron. A thin aluminium deposition thickness of 100 nm will soften and melt at temperatures around 645 degrees Celsius.

In one or more aspects, the gasket has a thickness being at least twice of that of an out of flatness of the outer surface of the first glass pane. Due to large compression forces exerted on the gasket during the VIG manufacturing process and due to the deformation properties of the gasket material it is preferred that the gasket it of a thickness at least twice as large as the unevenness within the surfaces to be sealed, such as 2.5 times larger than the out-of-flatness of the glass surface. The out of flatness may be measured with or without coatings on the surface, such as a Low-E coating, where the coated glass usually comprises a larger degree of out of flatness. For a tempered glass pane a typical out of flatness may be up to +/−0.1 mm or +/−0.2 mm for non-coated glass and up to +/−0.3 mm for coated glass. The degree of out-of-flatness covers deformations in the glass surfaces such as edge lifting and local bows which can be critical to the sealing efficiency between evacuation cup and glass surface without a suitable gasket. The local bows are created due to waviness in the surfaces resulting from the production of the tempered glass pane.

In one or more aspects, the gasket has a thickness between 0.6-2 mm, such as between 0.8-1.8 mm, such as 1.5 mm. The error on the thickness may be +/−10%.

In one or more aspects, the gasket has a variation in thickness across the gasket surface of less than 100 microns, preferably less than 50 microns. A small point-to-point height variation decreases the risk of generating gaps between the gasket material and the surfaces to be sealed, but generally a very large degree of flatness i.e. surface variation below 10 microns are not necessary for the present invention due to the flexibility of the gasket material, compared to other gasket materials on the market.

The gasket may comprise any shape suitable for creating the vacuum seal. The shape may e.g. be elliptical, square or rectangular. In one or more aspects the gasket has a circular shape. The gasket may in particular be ring-shaped. The second sealing surface of the gasket is configured to abut the contact surface(s) of the evacuation cup when arranged on the VIG unit and the gasket may be a constructed in a pattern similar to the pattern of the contact surface(s) of the evacuation cup. The gasket may comprise the same or a slightly smaller or larger diameter than the outer diameter of the evacuation cup. The evacuation cup may comprise a largest width of below 100 mm, such as below 50 mm or below 45 mm.

In one or more aspects the gasket is absent of a centre section allowing the void to be evacuated through the first cavity opening of the evacuation cup. Preferably the absent of the centred section, creating a centred gasket opening has a diameter that is close in size to the innermost diameter of the contact surface(s) of the evacuation cup, but should generally be of a size sufficient to facilitate the evacuation process via the evacuation opening. The gasket opening may create a first cavity void between the first cavity opening and the first glass pane and/or evacuation opening, which the void of the VIG unit may be evacuated through.

Additionally, the gasket may comprise further gasket openings e.g. in between the inner diameter i.e. centred hole and the outer diameter of the gasket. In one or more aspects the gasket comprises two concentric ring shaped regions separated by a ring shaped gasket opening, wherein the two concentric ring shaped regions are interconnected by at least one bridge region. Bridging means that the regions are interconnected, preferably by the same material as the ring-shaped regions, i.e. the gasket may be shaped and made from a single sheet of gasket material. The bridge regions may be of the same height as the rest of the gasket. The bridge regions are advantageous as they allow the gasket to be a single structure permitting for easy handling and maneuvering.

In one or more aspects the gasket comprises two, three, four, or five bridge regions bridging the two concentric ring shaped regions.

In one or more aspects, the gasket comprises one or more positioning aperture for allowing correct positioning of the gasket relative to the evacuation cup. The gasket may comprise one or more flange regions, extending beyond the outermost gasket opening. Each flange region may comprise a positioning aperture having a shape allowing interconnection of the gasket with the evacuation cup, e.g. the positioning aperture may have a keyhole shape configured to be connectable with a protrusion on the evacuation cup. Advantageously due to the positioning aperture, the gasket may readily be positioned in the correct position and contacting the evacuation cup at pre-determined locations. Furthermore the positioning apertures allows for gaskets to be more readily re-used as deformations in the gasket after use match the contact surfaces of the evacuation cup.

In one or more embodiments of the first aspect, the gasket is adapted to being used with a displacement tool for applying a force to said gasket via said evacuation cup, and wherein the gasket is capable of being compressed by an external force of approximately 50-200 N, such as 80-150 N, or such as between 90-110 N provided by said displacement tool.

In one or more embodiments according to the first or second aspect, the gasket is capable of being compressed by the sum of the forces applied by the evacuation cup due to the low pressure within the cup during the VIG unit void evacuation and the additional force applied by the displacement tool via the evacuation cup.

In one or more embodiments according to the first or second aspect, the displacement toll may be clamp arrangement capable of forcing the evacuation cup and the VIG unit towards each other, so as to apply a compressive force on said gasket. In one or more embodiments, the displacement tool may comprise a spring arrangement, having one or more springs. The spring(s) may be arranged such that a compression of the spring(s) provides a compressive force on said evacuation cup directed towards said gasket. The VIG unit may be supported by a support structure, capable of withstanding said applied force, such that the gasket is compressed.

In one or more embodiments according to the first or second aspect, the spring arrangement may be capable of being selectively activated, such that the compressive force can be applied on the gasket during selected parts of the VIG unit manufacturing process, e.g. only during evacuation of the void. In one or more embodiments, the applied weight by the spring arrangement on the evacuation cup substantially equals 10 kg.

In one or more embodiments according to the first or second aspect, said displacement tool may comprise a weight, arranged to be placed in connection with said evacuation cup, so as to displace the cup towards the VIG unit. The weight may be placed on top of said evacuation cup. In one or more embodiments, the applied weight on the evacuation cup substantially equals 10 kg. In one or more embodiments, the evacuation cup may preferably be capable of withstanding an external force of approximately 50-200 N, such as 80-150 N, or such as between 90-110 N, such that the majority of the force can be transferred to said gasket.

The present aspect relating to the gasket may comprise the features and advantages discussed with respect to the other aspects of the present invention.

The second aspect of the invention relates to the use of a gasket for evacuating a void between two glass panes in the production of a vacuum insulated glazing unit, wherein the vacuum insulated glazing unit comprises:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
wherein the gasket is adapted for being positioned between the evacuation cup and the outer surface of the first pane, the evacuation cup comprises:

a first cavity with a first cavity opening;
an exhaust opening for evacuating the void via the first cavity opening;
an evacuation cup body surrounding the first cavity; and
one or more contact surfaces including a first contact surface enclosing the first cavity opening,
the evacuation cup being adapted for covering the evacuation opening in the first glass pane and a part of the outer surface on the first glass pane surrounding the evacuation opening,
wherein the gasket comprises a first sealing surface and a second sealing surface opposite the first sealing surface, wherein the first sealing surface is adapted to be in direct contact with the one or more contact surfaces of the evacuation cup and the second sealing surface is adapted to be in direct contact with the first glass pane, the gasket providing an air tight seal between the one or more contact surfaces of the evacuation cup and the first glass pane,
wherein the gasket comprises a gasket material, which:
constitutes the majority of the gasket,
is compressible between the evacuation cup and outer surface of the first pane with an out of plane module of elasticity below 50 GPa, such as below 30 GPa, or below 25 GPa and
has a melting temperature above 400 degrees Celsius.

In one or more aspect, the gasket material is graphite. The material may be of the type characterised as flexible or expanded graphite. The purity of the graphite material may be above 97%. In one or more aspect, the purity of the graphite material is above 99.5%.

In one or more aspect, second sealing surface comprises a coating layer. The second sealing surface relates to the gasket surface abutting the surface of the first glass pane, such that the gasket may compensate for any irregularities in the planarity of the glass surface and eliminates leaks when squeezed between the evacuation cup and the glass pane.

In one or more aspect, the first sealing surface comprises a coating layer. The first sealing surface relates to the gasket surface abutting the contact surface(s) of the evacuation cup, such that the gasket may compensate for any irregularities in the planarity of the contacts surfaces and eliminates leaks when squeezed between the evacuation cup and the glass pane.

In one of more aspects, one or both of the sealing surfaces of the gasket comprises a coating layer. The coating layer may be made of silver (Ag), aluminium (Al), gold (Au), Zinc (Zn), copper (Cu) or alloys, such as e.g. Zn—Cu alloys. Other feasible materials include tungsten nitride (WN).

The coating layer is preferably adapted to become soft and fill out any minor cracks or minor surface irregularities within the glass surface and thereby increase the overall sealing efficiency of the gasket. Preferably this is facilitated while the coating layer is exposed to the high temperatures of the VIG unit manufacture process, as it will result in a sufficient softened state of the coating layer which can flow and fill the cracks. The coating material preferably facilitates good adhesion to the surfaces to be sealed as well as low outgassing and low permeation during the manufacture of the VIG unit. The coating layer may be a multilayer. One or both sealing surfaces may comprise e.g. a first material in the lowermost layer providing a good adhesion to the gasket material, a second material at the middle layer comprising excellent sealing properties such as elasticity, and a third material in an uppermost layer protecting the gasket from deterioration such as oxidation or heat damage due to environmental effects. Preferably the coating layer is of a material which becomes soft around 400-450 Celsius or below.

In one or more aspect, the coating layer is an aluminium layer. During the VIG manufacturing process aluminium softens sufficiently to flow into cracks and fill any irregularities in contact surfaces of the evacuation cup and the first glass pane surface.

In one or more aspect, the aluminium layer is deposited onto the graphite surface(s) by means of vapour deposition. The coating layer may be deposited using physical (PVD) or chemical vapour deposition (CVD), such as magnetron sputtering, atomic-layer deposition, thermal evaporation, e-beam evaporation, sputter deposition, Plasma-Enhanced chemical vapour deposition (PECVD) and deposition by pyrolysis, condensation, dip-coating or the like. It is preferred that the coating layer is deposited by a method producing a good adhesion of the coating layer to the surface(s) of the gasket material. The deposition may be undertaken using one or several deposition methods and the deposited layer may be a multilayer.

In one or more aspect, the aluminium coating layer is doped with silicon, e.g. 10 wt % silicon. The silicon reduced the melting temperature of the coating layer, such that when the gasket is in use, the coating layer may move into minor cracks at lower temperatures than when using a pure Al coating layer.

In one or more aspect, the coating layer(s) has a thickness below 5 microns, preferably between 0.05-3.0 microns, such as approximately 0.2 micron. In the use of the gasket, the Al layer may be pressed into minor cracks and departures from planarity within the surfaces to be sealed and block any possible pathways across the sealing surfaces.

In one or more aspect, the gasket has a thickness being at least twice of that of an out of flatness of the outer surface of the first glass pane. This is thickness relates to the initial thickness of the gasket prior to being compressed. When in use, at least parts of the gasket may be compressed so that the gasket adapts to protrusions on the gasket surface.

In one or more aspect, the gasket has a thickness between 0.6-2 millimetres, such as 0.8-1.8 millimetres, preferably approximately 1.5 millimetres. The error on the thickness is +/−10%. This is the initial thickness of the gasket prior to being in use and compressed. In the use of the gasket, the gasket may be compressed to approximately half of its initial thickness.

In one or more aspect, the gasket has a variation in thickness across the gasket surface of less than 100 microns, preferably less than 50 microns.

The gasket may comprise any shape suitable for the evacuation cup and for creating the vacuum seal, the shape may e.g. be elliptical, square or rectangular. In one or more aspect, the gasket has a circular shape. Preferably the second sealing surface of the gasket abuts the contact surface(s) of the evacuation cup when used with the evacuation cup on the VIG unit.

In one or more aspect, the gasket is absent of a centre section allowing the void to be evacuated through the first cavity opening of the evacuation cup. When in use the void may be evacuated through the centred gasket opening.

In one or more aspect, the gasket comprises two concentric ring shaped regions separated by a ring shaped gasket opening, wherein the two concentric ring shaped regions are interconnected by at least one bridge region. The ring-shaped gasket opening may be an annular opening concentric with the rings-shaped sealing surfaces of the gasket. The regions are preferably interconnected by the same material as the bridge regions, i.e. the gasket may be shaped and made from a single sheet of gasket material. The bridge regions may be of the same height as the rest of the gasket.

In one or more aspect, the gasket comprises two, three, four, or five bridge regions bridging the two concentric ring shaped regions. By connecting the ring-shaped regions of the gasket it may be readily placed in the correct position when to be used.

In one or more aspect, the ring shaped gasket opening allows a second void defined by the outer surface on the first glass pane and a second cavity in the evacuation body to be evacuated through a second exhaust opening, the second cavity having a second cavity opening concentric with the first cavity opening, the second cavity opening positioned between the first contact surface of the evacuation cup and a second contact surface of the evacuation cup, the evacuation cup further comprising a second exhaust opening. When the gasket is in use with the evacuation cup the ring-shaped gasket opening is preferably placed below the second cavity opening, such that open access is provided to the first glass pane, when the second cavity is evacuated. The second cavity may be evacuated to a pressure of around 0.1 mbar. When in use, the gasket sealing surfaces not only seals the first cavity from the exterior of the evacuation head, but it also seals the first cavity from the second cavity and the second cavity from the exterior of the evacuation cup.

In one or more aspects, the gasket comprises one or more positioning aperture for allowing correct positioning of the gasket relative to the evacuation cup. The one or more positioning aperture may be adapted to be interconnected with a protrusion on the evacuation cup such that the gasket can be readily positioned in the correct position relative to the evacuation cup and thereby contacting the evacuation cup at pre-determined locations. Furthermore the positioning apertures allows for gaskets to be more readily re-used as deformations in the gasket after use match the contact surfaces of the evacuation cup.

In one or more embodiments of the second aspect of the invention, the gasket is adapted to being used with a displacement tool for applying a force to said gasket via said evacuation cup, and wherein the gasket is capable of being compressed by an external force of approximately 50-200 N, such as 80-150 N, or such as between 90-110 N provided by said displacement tool.

The present aspect relating to the use of the gasket may comprise the features and advantages discussed with respect to the other aspects of the present invention such as the first aspect relating to gasket.

In one or more embodiments according to the second aspect, the gasket is capable of being compressed by the sum of the forces applied by the evacuation cup due to the low pressure within the cup during the VIG unit void evacuation and the additional force applied by the displacement tool via the evacuation cup.

In one or more embodiments according to the second aspect, the displacement toll may be clamp arrangement capable of forcing the evacuation cup and the VIG unit towards each other, so as to apply a compressive force on said gasket. In one or more embodiments, the displacement tool may comprise a spring arrangement, having one or more springs. The spring(s) may be arranged such that a compression of the spring(s) provides a compressive force on said evacuation cup directed towards said gasket. The VIG unit may be supported by a support structure, capable of withstanding said applied force, such that the gasket is compressed.

In one or more embodiments according to the first second aspect, the spring arrangement may be capable of being selectively activated, such that the compressive force can be applied on the gasket during selected parts of the VIG unit manufacturing process, e.g. only during evacuation of the void. In one or more embodiments, the applied weight by the spring arrangement on the evacuation cup substantially equals 10 kg.

In one or more embodiments according to the second aspect, said displacement tool may comprise a weight, arranged to be placed in connection with said evacuation cup, so as to displace the cup towards the VIG unit. The weight may be placed on top of said evacuation cup. In one or more embodiments, the applied weight on the evacuation cup substantially equals 10 kg. In one or more embodiments, the evacuation cup may preferably be capable of withstanding an external force of approximately 50-200 N, such as 80-150 N, or such as between 90-110 N, such that the majority of the force can be transferred to said gasket.

The third aspect of the present invention relates to an apparatus for evacuating a void between two glass panes in the production of a vacuum insulated glazing unit, the vacuum insulated glazing unit comprising:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
wherein the apparatus comprises:
  an evacuation cup comprising:
    a first cavity with a first cavity opening;
    an exhaust opening for evacuating the void via the first cavity opening;
    an evacuation cup body surrounding the first cavity; and
    one or more contact surfaces including a first contact surface on the evacuation cup body enclosing the first cavity opening,
  the evacuation cup being adapted for covering the evacuation opening in the first glass pane and a part of the outer surface on the first glass pane surrounding the evacuation opening, and
  a gasket comprising a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane,
  wherein the gasket comprises a gasket material, which:
    constitutes the majority of the gasket,
    is compressible between the evacuation cup and outer surface of the first pane with an out of plane module of elasticity below 50 GPa, such as below 30 GPa, or below 25 GPa, and
    has a melting temperature above 400 degrees Celsius.

As previously discussed in relation to the previous aspects of the inventions, the flexibility of the material preferably provides a gasket which is easy to shape and adapt to surfaces in abutment with gasket and any departures from planarity within these surfaces such as the shape of the evacuation cup contact surfaces and especially the out-of-flatness of the tempered glass surface, in order to provide an efficient seal which in turn facilitates achieving a high level of vacuum. The gasket and the evacuation cup within the apparatus may comprise any of the features and advantages discussed previously in relation to other aspects of the invention.

In one or more aspects, the gasket material is graphite. The purity of the graphite material may be above 97%. The purity of the graphite material may in another aspect be above 99.5%. The material may be of the type characterised as flexible or expanded graphite. Advantageously, the expanded graphite gasket material is very flexible due to the low module of elasticity as previously discussed and furthermore the gasket is able to maintain its sealing integrity at temperatures above 400 degrees Celsius near vacuum pressure, due to the properties of the graphite material such as a melting point well above 400 degrees Celsius which makes it highly stable to during large and sometimes rapid temperature variations VIG unit production.

In one or more aspects the second sealing surface comprises a coating layer. The second sealing surface is in direct contact with the first tempered glass pane, such that the gasket material may compensate for any irregularities in the planarity of the glass surface and eliminates leaks when squeezed between the evacuation cup and the glass pane. The coating layer may be adapted to fill out any minor cracks or minor surface irregularities within the glass surface and thereby increase the overall sealing efficiency of the gasket. Preferably this is facilitated while the coating layer is exposed to the high temperatures of the VIG unit manufacture process, as it will result in a sufficient softened state of the coating layer which can flow and fill the cracks. Preferably the coating layer is of a material which becomes soft around 400-450 Celsius or below.

In one or more aspects, the first sealing surface comprises a coating layer. The second sealing surface is in direct contact with the contact surfaces of the evacuation cup, such that the gasket may compensate for any irregularities in the planarity of the contacts surfaces and eliminates leaks when squeezed between the evacuation cup and the glass pane. The coating layer may be adapted to fill out any minor cracks or surface irregularities within the contact surfaces and thereby increase the sealing efficiency of the gasket. Preferably this is facilitated while the coating layer is exposed to the high temperatures of the VIG unit manufacture process, as it will result in a sufficient softened state of the coating layer which can flow and fill the cracks. Preferably the coating layer is of a material which becomes around 400-450 Celsius or below.

In one of more aspects, one or both of the sealing surfaces of the gasket comprises a coating layer which may be made of silver (Ag), aluminium (Al), gold (Au), copper (Cu), zinc (Zn) or alloys, such as e.g. Zn—CU alloys. Other feasible materials include tungsten nitride (WN).

The coating layer is preferably adapted to become soft and fill out any minor cracks or minor surface irregularities within the glass surface and thereby increase the overall sealing efficiency of the gasket. Preferably this is facilitated while the coating layer is exposed to the high temperatures of the VIG unit manufacture process, as it will result in a sufficient softened state of the coating layer which can flow and fill the cracks. The coating material preferably facilitates good adhesion to the surfaces to be sealed as well as low outgassing and low permeation during the manufacture of the VIG unit. The coating layer may be a multilayer. One or both sealing surfaces may comprise e.g. a first material in the lowermost layer providing a good adhesion to the gasket material, a second material at the middle layer comprising excellent sealing properties such as elasticity, and a third material in an uppermost layer protecting the gasket from deterioration such as oxidation or heat damage due to environmental effects.

In one or more aspects, the coating layer is an aluminium layer. Aluminium softens sufficiently at VIG unit manufacturing temperature whereby it may flow into cracks and fills any irregularities in contact surfaces of the evacuation cup and the first glass pane surface. It is thereby not necessary that the gasket and the coating comprises a completely smooth surface in order to provide an efficient seal as the gasket material will deform to large surface variation, such as up to +/−0.3 mm, of the abutting surfaces while the aluminium layer will fill any micro-cracks present.

In one or more aspect, the aluminium layer is deposited onto the graphite surface(s) by means of vapour deposition. The coating layer may be deposited using physical (PVD) or chemical vapour deposition (CVD), such as magnetron sputtering, atomic-layer deposition, thermal evaporation, e-beam evaporation, sputter deposition, Plasma-Enhanced chemical vapour deposition (PECVD) and deposition by pyrolysis, condensation, dip-coating or the like. It is preferred that the coating layer is deposited by a method producing a good adhesion of the coating layer to the surface(s) of the gasket material. The deposition may be undertaken using one or several deposition methods and the deposited layer may be a multilayer.

In one or more aspect, the aluminium coating layer is doped with silicon, e.g. 10 wt % silicon. At around 12 wt % of Si, the resulting melting point temperature of the coating layer will be around 577 degrees Celsius.

In one or more aspect, the coating layer(s) has a thickness below 5 microns, preferably between 0.05-3.0 microns, such as approximately 0.2 micron.

In one or more aspect, the gasket has a thickness being at least twice of that of an out of flatness of the outer surface of the first glass pane.

In one or more aspect, the gasket has a thickness between 0.6-2 millimetres, preferably between 0.8-1.8 millimetres, such as approximately 1.5 millimetres. The error on the thickness is +/−10%.

In one or more aspect, the gasket has a variation in thickness across the gasket surface of less than 100 microns, preferably less than 50 microns.

The gasket may comprise any shape suitable for the evacuation cup and for creating the vacuum seal, the shape may e.g. be elliptical, square or rectangular. In one or more aspect, the gasket has a circular shape. Preferably the second sealing surface of the gasket is configured to abut the contact surfaces of the evacuation cup when arranged on the VIG unit. The gasket may be a constructed in a pattern similar to the pattern of the contact surface(s) of the evacuation cup.

In one or more aspect, the gasket is absent of a centre section allowing the void to be evacuated through the first cavity opening of the evacuation cup. The gasket may preferably be ring-shaped.

In one or more aspect, the gasket comprises two concentric ring shaped regions separated by a ring shaped gasket opening, wherein the two concentric ring shaped regions are interconnected by at least one bridge region. The gasket opening may be an annular opening concentric with the rings-shaped sealing surfaces of the gasket. Bridging means that the regions are interconnected, preferably by the same material as the bridge regions, i.e. the gasket may be shaped and made from a single sheet of gasket material. The bridge regions may be of the same height as the rest of the gasket.

In one or more aspect, the gasket comprises two, three, four, or five bridge regions bridging the two concentric ring shaped regions.

In one or more aspects, the gasket comprises one or more positioning aperture for allowing correct positioning of the gasket relative to the evacuation cup. The gasket may comprise one or more flange regions, extending beyond the outermost gasket opening. Each flange region may comprise a positioning aperture having a shape allowing interconnection of the gasket with the evacuation cup, e.g. the positioning aperture may have a keyhole shape configured to be connectable with a protrusion on the evacuation cup.

In one or more aspects the first cavity opening of the evacuation cup is positioned in the centre of the evacuation cup. The evacuation cup wall and the first cavity opening are preferably concentric in a plane parallel to the contact surface and the first cavity opening of the evacuation cup.

In one or more aspects the evacuation cup comprises a second cavity in the evacuation body, the second cavity having a second cavity opening concentric with the first cavity opening, the second cavity opening positioned between the first contact surface of the evacuation cup and a second contact surface of the evacuation cup, the evacuation cup further comprising a second exhaust opening for evacuating the second cavity. The second cavity opening preferably extends all the way around the first cavity opening. The first contact surface defines the diameter of the first cavity opening and the inner diameter of the second cavity opening. The second contact surface defines the outer diameter of the second cavity opening and the outer diameter of the cup. Advantageously an evacuation of the second cavity results in a compressive force exerted on the second cavity by the atmospheric pressure outside the evacuation cup, whereby the probability of providing a good contact for the hermetic seal between the glass surface and the contact surfaces of the evacuation cup is increased, especially in the initial stages of the evacuation process. Additionally any gas entering the second cavity from a leak between the second contact surface and the glass pane surface may be evacuated through the second exhaust opening prior to reaching the first cavity.

In one or more aspects the ring shaped gasket opening allows a second void defined by the second cavity and the outer surface on the first glass pane to be evacuated through the second exhaust opening. Advantageously any gas entering the second cavity or second void from the outside of the evacuation cup e.g. due to gasket leak, may be evacuated through the second exhaust opening prior to reaching the first cavity and thereby the VIG unit void. Leaks of gas may enter the second void across either gasket sealing surfaces. The evacuation results in a compressive force on the second cavity and second void. Bridge regions may connect the ring-shaped regions of the gasket at separated positions, preferably distributed evenly around the second cavity opening. These bridge regions are preferably of minimal width such that a large fluid accessibility between the second cavity to the glass surface is maintained. Correspondingly, the gasket preferably comprises a minimal number of bridge regions.

The evacuation cup is preferably arranged to be placed on the first glass pane such that the second cavity and second void is enclosed by the first glass pane and the evacuation cup body. In one or more aspects the one or more contact surfaces is substantially parallel with the outer surface of the first glass pane when the evacuation cup is positioned on the outer surface of the first glass pane. In case the surfaces are rough, the mean surface lines (average surface height) of the contact surfaces are preferably parallel with the mean surface line of the first glass pane surface. The contact surfaces of the evacuation cup may be substantially planar, with minimal surface roughness achieved by abrasive methods such as polishing.

In one or more aspects, the one or more contact surfaces has a width between 0.50-1 mm, such as 0.75 mm. The width of the first contact surface corresponds to the width measured from the interface between the first contact surface and the first cavity opening to the interface between the first contacts surface and the second cavity opening. The width of the second contact surface corresponds to the width measured from the interface between the second cavity opening and the second contact surface to the interface between the second cavity opening and the outside of the evacuation cup. The surface width of the second and first contact surface may be the same or they may be different. The first contact surface may be narrower than the second contact surface, e.g. the second contact surface may be 1 mm wide while the first contact surface may be 0.50, 0.60 or 0.70 mm wide. In one or more aspects, the first contact surface may be 1 mm wide while the second contact surface may be several millimetres wide.

In one or more aspects, the evacuation cup comprises a first heat source for heating the first cavity. The heat source may be positioned within the cup body, in the first cavity or surrounding the evacuation cup. The heat source may comprise several heat elements distributed in a homogenous or symmetric manner about an axis extending outward from the evacuation opening. In an aspect the first heat source may be specifically configured to heat the area near the evacuation opening, e.g. seal material, such as a top frit sealing material, arranged around the evacuation opening. The seal may be produced by heating prior or during the VIG unit production, e.g. prior or during soldering of the side frit material.

In one or more aspects the first heat source comprises an electric heat source, made of high melting point material.

In one or more aspects the evacuation cup further comprises a second heat source. The heat source may be positioned within the cup body, in the first cavity or surrounding the evacuation cup. The heat source may comprise several heat elements distributed in a homogenous or symmetric manner about an axis extending outward from the evacuation opening. In one or more aspects the second heat source may be configured to heat the area near the evacuation opening, e.g. an evacuation member, such as a tube arranged in the evacuation opening.

The heat sources may be movable, e.g. the second heat source may be arranged to be movable in a direction substantially parallel to an axis extending from the evacuation opening.

In one or more aspects the second heat source is an electric heat source, made of high melting point material. The first heat source and/or the second heat source may alternatively comprise a laser located distant and directed to the first cavity. Other heat sources such as visible light, microwaves, IR or induction heating are also conceivable. The first heat source and/or the second heat source may comprise more than one of the same or similar types of heat sources. A combination of different heat sources may also be comprised in the first heat source and/or second heat source. In one or more aspects, a top frit sealing material placed around the evacuation opening and the evacuation member may be heated by the same heat source which provides the heating of the tube tip. In one or more aspects, the first heat source may comprise one or more heat cartridges embedded in the cup wall surrounding the first cavity. The second heat source may be a movable coil heater arranged in the first cavity above the evacuation opening and/or the evacuation member.

In one or more embodiments, the evacuation cup may be arranged to be connectable to a displacement tool for displacing said evacuation cup towards said gasket.

In one or more embodiments, the apparatus comprises a displacement tool for displacing said evacuation cup towards said gasket.

In one or more embodiments, the displacement toll may be clamp arrangement capable of forcing the evacuation cup and the VIG unit towards each other, so as to apply a compressive force on said gasket. In one or more embodiments, the displacement tool may comprise a spring arrangement, having one or more springs. The spring(s) may be arranged such that a compression of the spring(s) provides a compressive force on said evacuation cup directed towards said gasket. The VIG unit may be supported by a support structure in the furnace, capable of withstanding said applied force, such that the gasket is compressed.

In one or more embodiments, the spring arrangement may be capable of being selectively activated, such that the compressive force can be applied on the gasket during selected parts of the VIG unit manufacturing process, e.g. only during evacuation of the void. In one or more embodiments, the applied weight by the spring arrangement on the evacuation cup substantially equals 10 kg.

In one or more embodiments, said displacement tool may comprise a weight, arranged to be placed in connection with said evacuation cup, so as to displace the cup towards the VIG unit. The weight may be placed on top of said evacuation cup. In one or more embodiments, the applied weight on the evacuation cup substantially equals 10 kg. In one or more embodiments, the gasket may preferably be capable of maintaining the integrity of the sealing properties of the gasket during compression by the displacement tool applying e.g. external forces between approximately 50-200 N, such as 80-150 N, or such as between 90-110 N. The evacuation cup may preferably be capable of withstanding an external force of approximately 50-200 N, such as 80-150 N, or such as between 90-110 N. The present aspect relating to the apparatus for producing a VIG unit may comprise the features and advantages discussed previously with respect to the other aspects of the present invention.

The fourth aspect of the present invention relates to a method for producing a vacuum insulated glazing unit, the vacuum insulated glazing unit comprising:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material in the form of a side frit material peripherally arranged between the first glass pane and the second glass pane creating an internal void between the glass panes;
  an evacuation opening in the first glass pane, the evacuation opening allowing for the internal void to be evacuated there through, and
  a top frit material arranged around the evacuation opening, wherein the method comprises the steps of:
  placing a gasket and an evacuation cup for evacuating a void between two glass panes in the production of the vacuum insulated glazing unit over the evacuation opening, covering a portion comprising at least the evacuation opening and the top frit material, wherein the evacuation cup comprises:
    a first cavity with a first cavity opening;
    an exhaust opening for evacuating the void via the first cavity opening;
    an evacuation cup body surrounding the first cavity; and
    one or more contact surfaces including a first contact surface enclosing the first cavity opening,
  the evacuation cup being adapted for covering the evacuation opening in the first glass pane and a part of the outer surface on the first glass pane surrounding the evacuation opening, and
wherein the gasket comprise:
  a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane,
  wherein the gasket comprises a gasket material, which:
    constitutes the majority of the gasket,
    is compressible between the evacuation cup and the outer surface of the first pane with an out of plane module of elasticity below 50 GPa, such as below 30 GPa, or below 25 GPa, and
    has a melting temperature above 400 degrees Celsius.
  placing the vacuum insulated glazing unit with the evacuation cup and the gasket in a furnace;
  heating the side frit material and the top frit material to a softening temperature (Ts) by at least the furnace;
  lowering the temperature of the top frit material and the side frit material towards a curing temperature (Tcure);
  evacuating the void using a pump connected to the exhaust opening in the evacuation cup, and
  sealing the evacuation opening, so as to prevent gas from transferring between the void and the outside of the glass panes and thereby obtaining the vacuum insulated glazing unit.

The present method allows for a more cost- and time-efficient VIG unit manufacturing method as less time is needed for proper evacuation of the void due to the efficient gasket seal which in turn reduces production cost. Furthermore an optimized evacuation process produces a VIG unit of higher quality as the void comprises less contaminants and impurities.

The relatively low module of elasticity of the gasket material, allows the gasket to deform upon compression and adapt its surface shape to the height variations within the tempered glass pane surfaces and/or the evacuation cup contact surfaces. The deformability of the gasket may thereby eliminate any possible leaks across the sealing surfaces. Advantageously, the sealing efficiency of the gasket increases as the compressive force on the gasket increases as the pressure in the first cavity decreases during the evacuation process. The gasket may comprise any of the features and advantages discussed in relation to other aspects of the invention, particularly in relation to the first and second aspect of the invention.

Side frit material is positioned along the edges of one of the glass panes and the other glass pane is positioned on top, such that the side frit material is in between the glass panes and generates a void enclosed by the side frit material. Preferably the side frit material is in paste-form so that it is easier to apply. Spacers are placed on either the first or second glass pane prior to assembling. Access to the void is accommodated by an evacuation opening in the surface of the first glass pane, such that the void may be evacuated through this opening. Top frit material may be placed around the evacuation opening and it may be in paste or in a solid form. The VIG unit is placed in the furnace such that the large surfaces i.e. the inner and outer surfaces of the glass panes are horizontally orientated with the evacuation apparatus, comprising evacuation cup and gasket, on top of the VIG unit.

In one or more aspect of the invention, the heating of the side frit material and top frit material may be achieved by at least the furnace. Additional heat sources may be present in the furnace, such as IR, visible light, microwave, induction, ceramic or electric heating, directed to the side frit material and/or the top frit material.

Preferably the frit materials are heated such that they soften and preferably the material flows and adheres to appointed surfaces to be sealed, e.g. the side frit material may thereby attach to the opposing inner surfaces of the glass panes and the top frit material starts to fill the evacuation opening.

The softening temperature (Ts) is preferably high enough to sinter and solder the frit materials to the surfaces to be sealed. The softening temperature may be between 320-390 degrees Celsius, such as 330-370 degrees Celsius, such as 340-360 degrees Celsius, for example 350 degrees Celsius.

In one or more aspect of the present invention, the joining and bonding processes, during the heat treatment of the frit materials, are dynamic processes and requires a certain minimum period of time to fulfil. The method may be in one or more aspect further comprising the step of maintaining the softening temperature (Ts) of the frit materials for at least 3 min. The temperatures may be maintained for at least 10 min, such as at least 20 min or at least 30 min or such as at least 40 min or for a period of time up to 60 minutes, depending on the softening temperature used.

By lowering the temperature of the top frit material and the side frit material, the frit materials are allowed to cure and settle prior to initiating the evacuation process. The viscosity of the side frit material may be in a deformable state upon evacuation, which permits the glass panes to move towards each other without creating any undesirable internal stresses along the glass panes. Furthermore the viscosity may be sufficiently high to withstand vacuum pressure and prevent being sucked into the void. In an aspect of the invention the curing temperature (Tcure) may be between 275-380 degrees Celsius, such as between 290-370 degrees Celsius, or such as between 300-360 degrees Celsius. Alternatively, the viscosity of the side frit material may be in a state upon evacuation, which is not deformable by the evacuation process.

The pump may be connected to the exhaust opening using a tube or conduit. The pump is a vacuum pump of the type suitable for achieving pressures down to a pressure below 0.001 mbar, such as 0.0005 mbar or 0.0001 mbar. More than one pump may also be in fluid connection with the void. As the void is evacuated the glass panes may be forced towards each other until the spacers are sandwiched in between and prevent any further compression of the glazing unit. The spacers are preferably of a structure and material which can maintain the separation of the glass panes throughout the lifetime of the VIG unit.

The side frit material and the top seal frit material (hereafter collectively referred to as the frit materials) may be of the same frit type or they may be made of different frit types.

After evacuation of the void has been achieved to a sufficient pressure, the evacuation opening may be closed by heating the top frit material such that it melts and closes the opening.

In one or more aspects, the evacuation cup comprises a first heat source for heating the first cavity. The first heat source may be positioned within the cup body, in the first cavity or surrounding the evacuation cup. The first heat source may comprise several heat elements distributed in a homogenous or symmetric manner about an axis extending outward from the evacuation opening. The first heat source may be specifically configured to heat the first cavity or the area near the evacuation opening, e.g. top frit material arranged around the evacuation opening. The first heat source may comprise an electric heater having an electric heat element or heat cartridges or alternatively the heat source may comprise a laser located distant and directed to the first cavity and/or the top frit material. Other heat sources such as visible light, microwaves, IR or induction heating are also conceivable. The first heat source may comprise more than one of the same or similar types of heat sources. A combination of different heat sources may also be comprised in the first heat source.

The side frit material and the top frit material may not be heated to the same temperature prior to the method step of lowering the temperatures of the frit materials towards the curing temperature (Tcure) but may respectively be heated to two different temperatures: softening temperature (Ts) and heat treatment temperature (Th).

In one or more aspects, the method may comprise in the step of heating the side frit material and the top frit material by at least the furnace:
  the side frit material is heated to a softening temperature (Ts), and
  the top frit material is heated to a heat treatment temperature (Th) by means of a first heat source of the evacuation cup, wherein the heat treatment temperature (Th) is larger than the softening temperature (Ts) by at least 5 degrees Celsius.

The applied heat treatment temperature (Th) may preferably be applied in order to increase the sealing efficiency of the resulting top frit seal. The top frit material may be partly or fully heated above its melting point, whereby material can be altered to a degree whereby the melting temperature is shifted to a different temperature range. The finished top seal may then comprise a melting temperature situated at a higher temperature than prior to the heat treatment, and thereby result in a more temperature stable seal throughout the VIG manufacturing method and the lifetime of the VIG unit. The heat treatment temperature (Th) may be between 380-460 degrees Celsius, such as between 400-440 degrees Celsius, such as 410-430 degrees Celsius, such as 420 degrees Celsius. The VIG unit void is evacuated through the first cavity at temperatures above 275 degrees Celsius, and simultaneously the portion covered by the evacuation cup is exposed to the low pressures used in the evacuation process. Therefore it is of further advantage that the top frit material achieves a shift in melting point towards higher temperatures prior to being exposed to low pressures.

Preferably only the top frit material and the immediate surrounding material, such as a small part of the first glass pane is exposed to the heat treatment temperature (Th), such that the majority of the glass panes are not affected by the increased temperature, which may alter the properties of the tempered glass. Due to the large thermal stability of the gasket, as a result of the high melting point, the gasket can maintain its sealing ability throughout the heat treatment process of the top frit material.

The method may be in one or more aspect further comprising the step of maintaining the heat treatment temperature (Th) of the top frit material and the softening temperature (Ts) of the side frit material for at least 3 min. The temperatures may be maintained for at least 10 min, such as 20 min or 30 min. In one or more aspects, the heat treatment temperature (Th) and the softening temperature (Ts) is maintained for a period of time up to 60 minutes, depending on the heat treatment temperature used. The heat treatment temperature (Th) of the top frit material may for example be set to 410 degrees Celsius for a period of time between 25 to 50 minutes or the heat treatment temperature may be set to 420 degrees Celsius for a period of time between 35 to 60 minutes.

In one or more aspects, the vacuum insulated glazing unit further comprises an evacuation member in the evacuation opening, the evacuation member preferably being a hollow tube, through which evacuation member the internal void can be evacuated. The evacuation member may be of any structure or material which will allow gas to transfer between the interior to the exterior of the VIG unit during the evacuation of the void and which is able withstand the temperature profile of the method without substantial deformation or detachment. In a preferred aspect the evacuation member may be made of a material having a coefficient of thermal expansion (CTE) which is similar to the CTE of the frit material, and preferably also the glass pane. The top frit material may be applied around the evacuation member and between the evacuation member and the evacuation opening such that gas may only be evacuated through the evacuation member.

In one or more aspects, the top frit material is made of lead-free solder frit material.

Lead-free frit materials provide environmental and recycling advantages. Preferably also the side frit material is lead-free.

In one or more aspects, the sealing method of the evacuation member post evacuation of the void is dependent on the type of evacuation member used. The walls of metal tubes may be squeezed at a protruding end in order to eliminate the opening of the metal tube. Glass tubes may be melted in order to be sealed.

In one or more aspect, the member may be melted by the first heat source or by a second heat source comprised in the evacuation cup. The second heat source may be positioned within the cup body, in the first cavity or surrounding the evacuation cup. The second heat source may comprise several heat elements distributed in a homogenous or symmetric manner about an axis extending outward from the evacuation opening. The first heat source may comprise an electric heater having an electric heat element or heat cartridges or alternatively the heat source may comprise a laser located distant and directed to the evacuation member. Other heat sources such as visible light, microwaves, IR or induction heating are also conceivable. The second heat source may comprise more than one of the same or similar types of heat sources. A combination of different heat sources may also be comprised in the first heat source.

In one or more embodiments, the evacuation cup may be adapted to be displaced towards said gasket by a displacement tool, and the method may comprise the step of applying a compressive force to said gasket by said displacement tool via said evacuation cup.

In one or more embodiments according to the fourth aspect, the displacement toll may be clamp arrangement capable of forcing the evacuation cup and the VIG unit towards each other, so as to apply a compressive force on said gasket. In one or more embodiments, the displacement tool may comprise a spring arrangement, having one or more springs. The spring(s) may be arranged such that a compression of the spring(s) provides a compressive force on said evacuation cup directed towards said gasket. The VIG unit may be supported by a support structure in the furnace, capable of withstanding said applied force, such that the gasket is compressed. In one or more embodiments, the spring arrangement may be capable of being selectively activated, such that the compressive force can be applied on the gasket during selected parts of the VIG unit manufacturing process, e.g. only during evacuation of the void. In one or more embodiments, the applied weight by the spring arrangement on the evacuation cup substantially equals 10 kg.

In one or more embodiments according to the fourth aspect, said displacement tool may comprise a weight, arranged to be placed in connection with said evacuation cup, so as to displace the cup towards the VIG unit. The weight may be placed on top of said evacuation cup. In one or more embodiments, the applied weight on the evacuation cup substantially equals 10 kg. In one or more embodiments, the gasket may preferably be capable of maintaining the integrity of the sealing properties of the gasket during the additional compression provided by the displacement tool e.g. at external forces between approximately 50-200 N, such as 80-150 N, or such as between 90-110 N. In one or more embodiments, the evacuation cup may preferably be capable of withstanding an external force of approximately 50-200 N, such as 80-150 N, or such as between 90-110 N.

In one or more embodiments according to the fourth aspect, the method may comprise the step of activating the displacement tool, e.g. comprising a spring arrangement, upon evacuation of the void, such that the compressive force on said gasket is only applied during the method step of evacuating the void. The compressive force may additionally be applied during subsequent method steps. The displacement tool thereby does not affect the VIG unit, gasket or evacuation cup during the previous method steps.

In one or more aspect, several VIG units may be manufactured simultaneously in the furnace each placed in the furnace each having an evacuation cup and a gasket. After the VIG method has been executed the gasket may readily be removed from the glass pane, without leaving any marks, due to the high melting temperature of the gasket material.

In one of more aspects, one or both of the sealing surfaces of the gasket comprises a coating layer. The coating layer may be made of silver (Ag), aluminium (Al), gold (Au), copper (Cu), zink (Zn) or alloys, such as e.g. Zn—Cu alloys. Other feasible materials include tungsten nitride (WN). The coating material preferably facilitates good adhesion to the surfaces to be sealed as well as low outgassing and low permeation during the manufacture of the VIG unit. The coating layer may be a multilayer. One or both sealing surfaces may comprise e.g. a first material in the lowermost layer providing a good adhesion to the gasket material, a second material at the middle layer comprising excellent sealing properties such as elasticity, and a third material in an uppermost layer protecting the gasket from deterioration such as oxidation or heat damage due to environmental effects.

In one or more aspect the gasket material may be coated with an aluminium coating on at least one sealing surface. The coating may be below 5 microns in thickness and preferably it will sufficiently soften under the applied pressures and temperatures of the method, such that it can flow into minor departures from planarity and openings in the first glass pane surface of the one or more contact surface and block any minor pathways from the outside of the evacuation cup to the first cavity.

In one or more aspect, a second cavity may be present in the evacuation body with a second cavity opening to the first glass pane, when the evacuation cup is arranged on the VIG unit. The gasket may correspondingly comprise a second gasket opening allowing access between the second cavity and the first glass pane surface. The second cavity being in fluid connection with a pump may be utilizes to provide a compression force on the cup towards the first glass pane, which may be of significant advantage upon initiating the evacuation of the void through the first cavity.

The present aspect relating to the method for producing a VIG unit may comprise the features and advantages discussed with respect to the other aspects of the present invention.

A fifth aspect of the invention relates to a gasket for use in evacuation of a void between two glass panes in the production of a vacuum insulated glazing unit, the vacuum insulated glazing unit comprising:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
wherein the gasket comprises a first sealing surface and a second sealing surface opposite the first sealing surface, wherein the gasket is adapted for being positioned between the outer surface of the first pane and an evacuation cup, the evacuation cup comprising:
  a first cavity with a first cavity opening,
  an exhaust opening for evacuating the void via the first cavity opening,
  an evacuation cup body surrounding the first cavity, and
  one or more contact surfaces including a first contact surface on the evacuation cup body enclosing the first cavity opening,
the evacuation cup being adapted for covering the evacuation opening in the first glass pane and a part of the outer surface on the first glass pane surrounding the evacuation opening,
wherein the gasket is configured to provide an air tight seal between the one or more contact surfaces of the evacuation cup and the first glass pane during evacuation of the void, with the first sealing surface of the gasket in direct contact with the one or more contact surfaces of the evacuation cup and the second sealing surface of the gasket in direct contact with the first glass pane, wherein the gasket comprises a gasket material constituting a majority of the gasket, wherein the gasket material is graphite.

The fifth aspect of the invention may comprise any of the features, embodiments and advantages described in relation to the first aspect of the invention.

The sixth aspect of the invention relates to a use of a gasket for evacuating a void between two glass panes in the production of a vacuum insulated glazing unit, wherein the vacuum insulated glazing unit comprises:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
  wherein the gasket is adapted for being positioned between the evacuation cup and the outer surface of the first pane, the evacuation cup comprises:
  a first cavity with a first cavity opening;
  an exhaust opening for evacuating the void via the first cavity opening;
  an evacuation cup body surrounding the first cavity; and
  one or more contact surfaces including a first contact surface enclosing the first cavity opening,
  the evacuation cup being adapted for covering the evacuation opening in the first glass pane and a part of the outer surface on the first glass pane surrounding the evacuation opening,
  wherein the gasket comprises a first sealing surface and a second sealing surface opposite the first sealing surface, wherein the first sealing surface is adapted to be in direct contact with the one or more contact surfaces of the evacuation cup and the second sealing surface is adapted to be in direct contact with the first glass pane, the gasket providing an air tight seal between the one or more contact surfaces of the evacuation cup and the first glass pane,
  wherein the gasket comprises a gasket material constituting a majority of the gasket, wherein the gasket material is graphite.

The sixth aspect of the invention may comprise any of the features, embodiments and advantages described in relation to the second aspect of the invention.

The seventh aspect of the invention relates to an apparatus for evacuating a void between two glass panes in the production of a vacuum insulated glazing unit, the vacuum insulated glazing unit comprising:
  a first tempered glass pane and a second tempered glass pane arranged in parallel, the first glass pane and the second glass pane each having an inner surface and an outer surface, the inner surfaces opposing each other;
  spacers arranged between the opposed inner surfaces;
  a side sealing material peripherally arranged between the first glass pane and the second glass pane creating an internal void between the glass panes, and
  an evacuation opening in the first glass pane, the evacuation opening allowing for the internal void to be evacuated there through,
  wherein the apparatus comprises:
  an evacuation cup comprising:
    a first cavity with a first cavity opening;
    an exhaust opening for evacuating the void via the first cavity opening;

an evacuation cup body surrounding the first cavity; and one or more contact surfaces including a first contact surface on the evacuation cup body enclosing the first cavity opening, the evacuation cup being adapted for covering the evacuation opening in the first glass pane and a part of the outer surface on the first glass pane surrounding the evacuation opening, and a gasket comprising a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane, wherein the gasket comprises a gasket material constituting a majority of the gasket, wherein the gasket material is graphite.

The seventh aspect of the invention may comprise any of the features, embodiments and advantages described in relation to the third aspect of the invention.

The eight aspect relates to a method for producing a vacuum insulated glazing unit, the vacuum insulated glazing unit comprising:

a first tempered glass pane and a second tempered glass pane arranged in parallel, the first glass pane and the second glass pane each having an inner surface and an outer surface, the inner surfaces opposing each other;

spacers arranged between the opposed inner surfaces;

a side sealing material sealing and creating an internal void between the glass panes;

an evacuation opening in the first glass pane, the evacuation opening allowing for the internal void to be evacuated there through, and a top sealing material arranged around the evacuation opening, wherein the method comprises the steps of:

placing a gasket and an evacuation cup for evacuating a void between two glass panes in the production of the vacuum insulated glazing unit over the evacuation opening, covering a portion comprising at least the evacuation opening and the top sealing material, wherein the evacuation cup comprises:

a first cavity with a first cavity opening;
an exhaust opening for evacuating the void via the first cavity opening;
an evacuation cup body surrounding the first cavity; and
one or more contact surfaces including a first contact surface enclosing the first cavity opening, the evacuation cup being adapted for covering the evacuation opening in the first glass pane and a part of the outer surface on the first glass pane surrounding the evacuation opening, and wherein the gasket comprises:

a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane, wherein the gasket comprises a gasket material, which:
constitutes the majority of the gasket,
is compressible between the evacuation cup and the outer surface of the first pane with an out of plane module of elasticity below 50 GPa, such as below 30 GPa, or below 25 GPa, and
has a melting temperature above 400 degrees Celsius.

placing the vacuum insulated glazing unit with the evacuation cup and the gasket in a furnace;

heating the VIG unit, gasket and evacuation cup by at least the furnace;

evacuating the void using a pump connected to the exhaust opening in the evacuation cup, and sealing the evacuation opening, so as to prevent gas from transferring between the void and the outside of the glass panes and thereby obtaining the vacuum insulated glazing unit.

In one or more embodiments, the heating step, heating the VIG unit, gasket and evacuation unit, may be to facilitate a thermal cleaning of the void. The thermal cleaning of the void may release species and pollutants from the surfaces within the void and which can be evacuated during evacuation of the void. An efficient thermal cleaning of the void may be enabled at temperatures above 275 degree Celsius. Additionally or alternatively, the heating step may be provided to increase the temperature of the side sealing material and/or the top sealing material, so as to facilitate the creating of a top seal and a side seal. Additionally the method may comprise step of lowering the temperature of the top sealing material and the side sealing material towards a curing temperature (Tcure).

In one or more embodiments of one or more aspect of the invention, the side sealing material or the top sealing material or both, may be made of a metal oxide material, or metal or a glassy seal material such as a solder frit material, or any other suitable material.

The eight aspect of the invention may comprise any of the features, embodiments and advantages described in relation to the fourth aspect of the invention.

The ninth aspect of the invention relates to a method for producing a vacuum insulated glazing unit, the vacuum insulated glazing unit comprising:

a first tempered glass pane and a second tempered glass pane arranged in parallel, the first glass pane and the second glass pane each having an inner surface and an outer surface, the inner surfaces opposing each other;

spacers arranged between the opposed inner surfaces;

a side sealing material in the form of a side frit material peripherally arranged between the first glass pane and the second glass pane creating an internal void between the glass panes;

an evacuation opening in the first glass pane, the evacuation opening allowing for the internal void to be evacuated there through, and a top frit material arranged around the evacuation opening, wherein the method comprises the steps of:

placing a gasket and an evacuation cup for evacuating a void between two glass panes in the production of the vacuum insulated glazing unit over the evacuation opening, covering a portion comprising at least the evacuation opening and the top frit material, wherein the evacuation cup comprises:

a first cavity with a first cavity opening;
an exhaust opening for evacuating the void via the first cavity opening;
an evacuation cup body surrounding the first cavity; and
one or more contact surfaces including a first contact surface enclosing the first cavity opening,
the evacuation cup being adapted for covering the evacuation opening in the first glass pane and a part of the outer surface on the first glass pane surrounding the evacuation opening, and
wherein the gasket comprises:
a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane,
wherein the gasket comprises a gasket material a majority of the gasket, wherein the gasket material is graphite,
wherein the method further comprises the steps of:
placing the vacuum insulated glazing unit with the evacuation cup and the gasket in a furnace;
heating the side frit material and the top frit material by at least the furnace;
lowering the temperature of the top frit material and the side frit material towards a curing temperature;
evacuating the void using a pump connected to the exhaust opening in the evacuation cup, and
sealing the evacuation opening, so as to prevent gas from transferring between the void and the outside of the glass panes and thereby obtaining the vacuum insulated glazing unit.

The ninth aspect of the invention may comprise any of the features, embodiments and advantages described in relation to the fourth aspect of the invention.

BRIEF DESCRIPTION OF THE DRAWINGS

FIG. 4a shows a cross-sectional view of an evacuation cup arranged on a VIG unit with a gasket in between.

FIG. 4b shows a cross-sectional view of a gasket along the line A-A shown in FIG. 4a.

FIG. 5b shows an exemplary cross-sectional view of a gasket along the line A-A shown in FIG. 5a.

FIG. 5c shows an exemplary cross-sectional view of a gasket with bridge regions along the line A-A shown in FIG. 5a.

DETAILED DESCRIPTION

Figure 1:
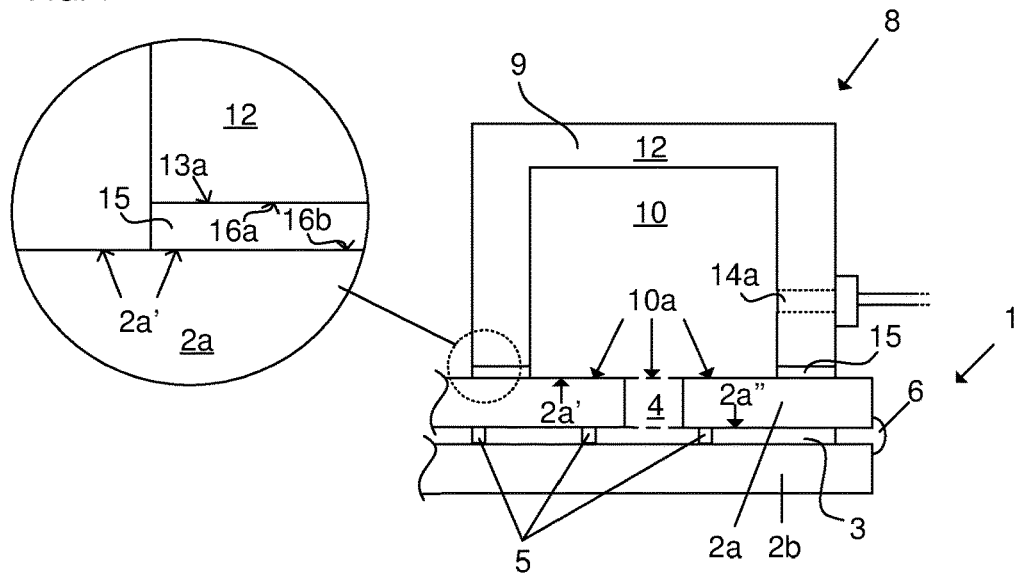
FIG. 1 shows a cross-sectional view of an evacuation cup arranged with gasket on a VIG unit over an evacuation opening. The expanded view shows an interface between the evacuation cup, gasket and first glass pane.

The first aspect of the present invention relates to a gasket 15 for providing a vacuum in a vacuum insulated glazing (VIG) unit 1. As shown in FIGS. 1, 2b, 4a, 6a-b, the VIG unit 1 comprises a void 3 enclosed between two tempered glass panes 2a, 2b placed on top of each other and opposing each other. An evacuation opening 4 is provided through the first glass pane 2a, such that gas can travel from the inner surface of the panes 2a", 2b" to the outer surface of the panes 2a', 2b' through the evacuation opening 4, as shown in FIG. 1. A number of spacers 5 are arranged between the glass panes 2a, 2b in order to maintain the separation of the glass panes 2a, 2b at a suitable distance providing optimum insulating effects. A typical distance between the two glass panes 2a, 2b is about 0.2 millimetres. A side sealing material 6 is arranged peripherally between the two glass panes 2a, 2b and is enclosing the void 3. In the present example, the side sealing material 6 is made of lead-free soldering frit material 6a. In one or more examples, the gasket 15 is arranged on the VIG unit 1 between the first glass pane 2a and an evacuation cup 9.

As shown in FIGS. 1, 2a-b, 4a, 5a and 6a-b, the evacuation cup 9 in one or more examples comprises an evacuation cup body 12 and a first cavity 10 within the cup body 12 which is arranged to be in fluid communication with the evacuation opening 4 of the VIG unit 1 by means of a first cavity opening 10a. The evacuation cup 9 further comprises a first contact surface 13a enclosing the first cavity opening 10a, and a first exhaust opening 14a through the evacuation cup body 12 and in fluid communication with the first cavity 10. As shown in FIGS. 2a-b, 5a and 6b, the evacuation cup 9 may additionally comprise a second cavity 11 in the evacuation cup body 12.

Figure 2A:
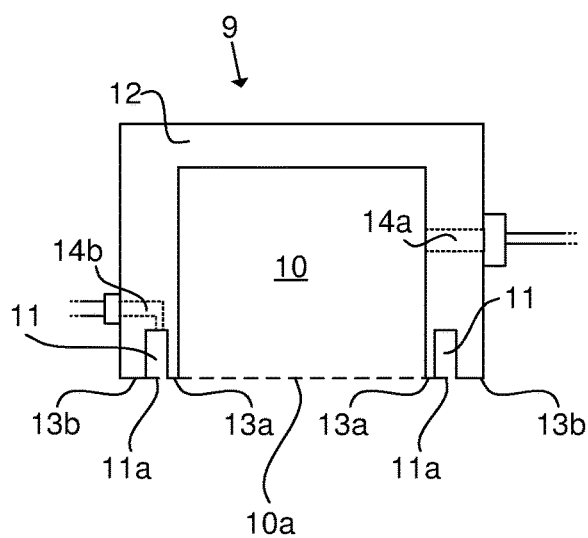
FIG. 2a shows a cross-sectional view of an evacuation cup comprising a first and a second cavity, first and second cavity openings and first and second contact surfaces.

The evacuation cup 9 comprises a first contact surface 13a enclosing the first cavity opening 10a of the first cavity 10 and a second contact surface 13b enclosing the first contact surface 13a and the second cavity opening 11a of the second cavity 11, additionally the first contact surface 13a and second contact surface 13b are arranged in a concentric configuration as illustrated in FIG. 2a.

Figure 2B:
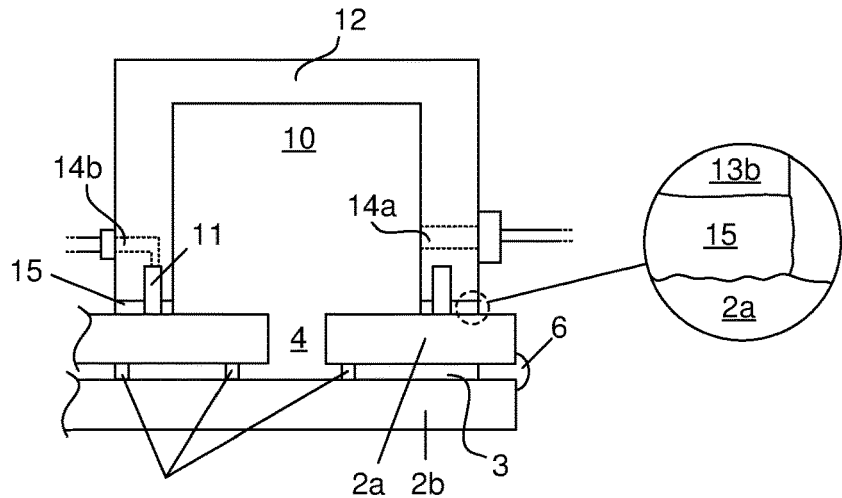
FIG. 2b shows a cross-sectional view of an evacuation cup comprising a first and a second cavity arranged on a VIG unit with a gasket. The figure also shows an expanded view of the interfaces between the evacuation cup and the gasket and the gasket and the first glass pane.
Figure 5A:
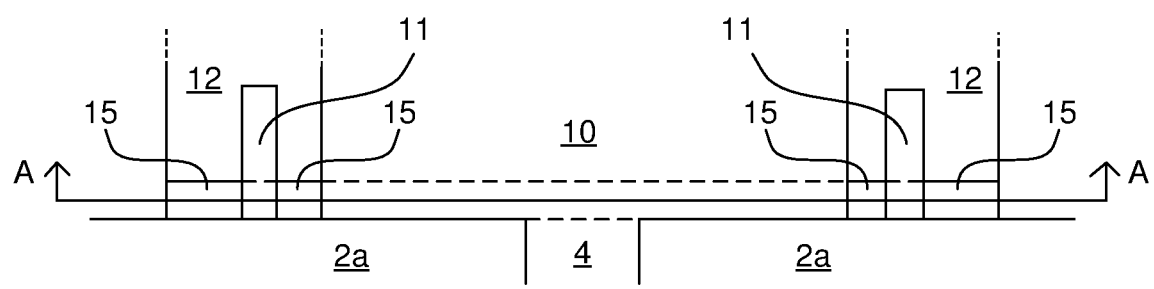
FIG. 5a shows a cross-sectional view of the interface between an evacuation cup, a gasket and a first glass pane of a VIG unit.
Figure 6A:
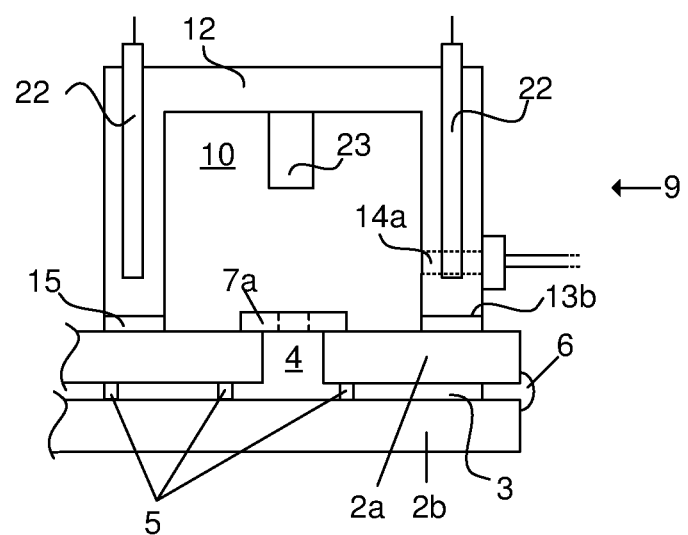
FIG. 6a shows a cross-sectional view of an evacuation cup comprising heat sources and a first cavity arranged on a VIG unit with a gasket in between. Top frit material is placed around the evacuation opening.
Figure 6B:
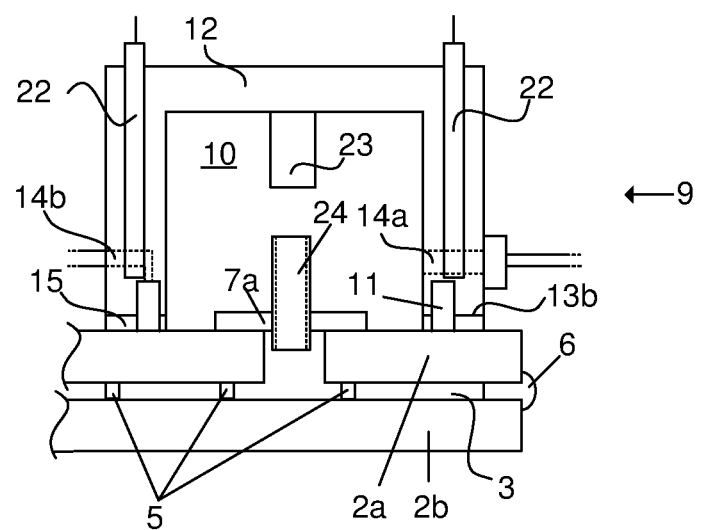
FIG. 6b shows a cross-sectional view of an evacuation cup comprising heat sources and a first and second cavity arranged on a VIG unit with a gasket in between. Top frit material positioned around a tube and around the evacuation opening.

In FIGS. 2b, 5a and 6b, the evacuation cup 9 is arranged on a VIG unit 1 such that the first contact surface 13a and the second contact surface 13b are in abutment with the gasket 15 which in turn is in abutment with the outer surface of the first tempered glass pane 2a'. A second exhaust 14b is in connection with the second cavity 11 for fluid communication between the second cavity 11 and the outside of the evacuation cup 9.

In one or more examples, the evacuation cup 9 is of circular shape in a cross-section in a plane parallel to the glass panes 2a, 2b and the diameter of the evacuation cup 9 measured parallel to the first contact surfaces 13a, 13b is around 50 mm.

The majority of the gasket 15 is made of a flexible gasket material 15'. In one or more of the present examples, the gasket material 15' is made from an expanded graphite sheet with a compression modulus of elasticity below 5 GPa and a melting temperature around 3500 degrees Celsius.

FIGS. 1, 2b, 3, 4a, 5a, 6a and 6b shows a cross-sectional view of a gasket 15 arranged between an evacuation cup 9 and a VIG unit 1 according to examples of the invention. As shown in the figures, and specifically in the expanded view in FIG. 1, the gasket 15 is positioned between the evacuation cup 9 and the first glass pane 2a, such that the first sealing surface 16a is in abutment with the first contact surface 13a of the evacuation cup 9 and such that the second sealing surface 16b is in abutment with the outer surface of the first glass pane 2a". The gasket 15 adapts its sealing surfaces 16a, 16b to the shape of the abutting surfaces. In the present example, the contact surfaces 13a, 13b are substantially planar and extend perpendicularly to the sides of the evacuation cup 9. In an ideal situation the contact surfaces 13a, 13b and the outer surface of the first glass pane 2a' are perfectly smooth which would make the evacuation cup 9 easy to seal for the evacuation process. In the present examples, the glass panes 2a, 2b used are tempered glass panes which comprises an outer surface with an out of flatness parameter of around +/−0.1 mm. The expanded gasket material 15' adapts the shape of its sealing surfaces 16a, 16b to the roughness of the first glass pane 2a due to the flexibility of the gasket material 15'. The gasket 15 is of a thickness of about 1.5 mm, and may deform to the glass pane surface 2a' and simultaneously adapt to the surface profile of the contact surfaces 13a, 13b of the evacuation cup 9. FIG. 2b shows a gasket placed between the first glass pane 2a and an evacuation cup 9 comprising a second cavity 11 and a second cavity opening. The expanded view in FIG. 2b illustrates the gaskets 15 ability to fill any surfaces irregularities in the abutting surfaces 13b, 2a'.

The gasket 15 in the present examples is made of a flexible material 15', which may be compressed to a large degree without forming cracks and breaking of the gasket material 15'. A flexible gasket 15 of this type readily adapts to the surface contours of the abutting surfaces 2a', 13a, 13b and thereby fills out any valleys or holes in the surfaces 2a', 13a, 13b, and prevent these valleys or holes from being used as pathways for the air or other gas travelling across the sealing surfaces 16a, 16b and the abutting surfaces 2a', 13a, 13b as illustrated in the expanded view in FIG. 2b. Additionally the gasket material 15' also comprises a large melting point. The melting point of the material determines the ability of the gasket 15 to maintain its structure and integrity throughout the VIG manufacturing process.

Figure 3:
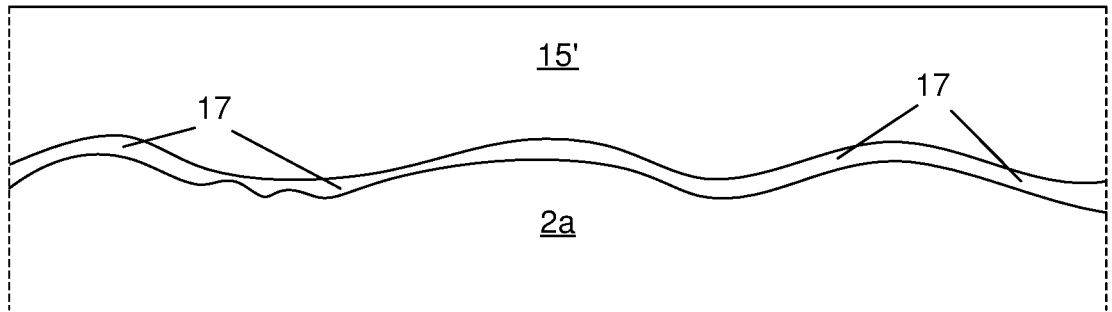
FIG. 3 shows a cross-sectional view of an interface between a gasket coated with an coating layer and a surface of a first glass pane.

In an example, the gasket 15 comprises a graphite material 15', which is coated with a coating layer 17 comprising aluminium on one or each gasket material surface. An example of the gasket comprising a coating layer is illustrated in FIG. 3. The coating layer 17 adds to the sealing efficiency of the gasket 15 as minor cracks within the abutting surfaces 2a', 13a, 13b can be filled by the coating layer 17 as the coating layer 17 flows into the cracks when exerted to the temperature and pressures of the VIG unit process. In another example, the aluminium may be doped with silicon in order to lower the melting temperature of the coating layer 17 such that the flowability of the coating layer 17 is increased.

The gasket material 15' e.g. expanded graphite sheet may be readily cut into the desired shape matching the contact surfaces 13a, 13b of the evacuation cup 9. In the present example the gasket 15 is generally cut to the dimensions of the contacts surfaces 13a, 13b.

Figure 4A:
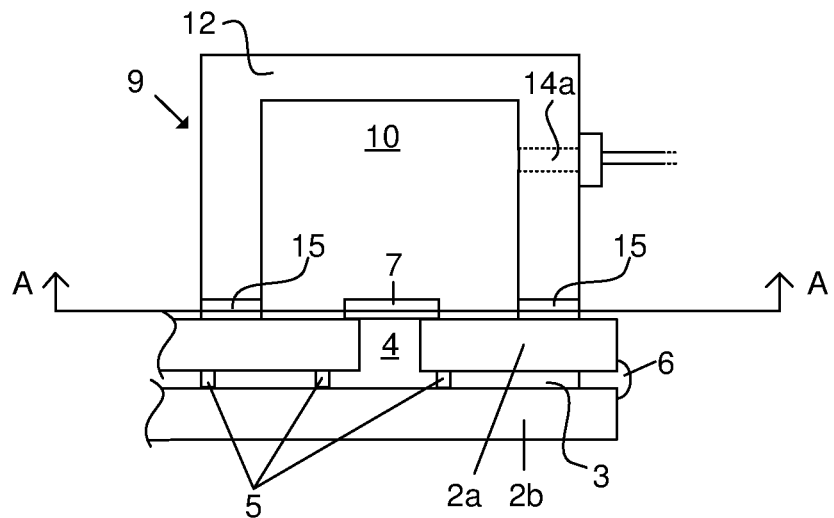

In one or more examples, a top sealing material 7 for sealing the evacuation opening 4, may be placed around or near the evacuation opening 4, as illustrated in FIG. 4a. In an example the sealing material is a lead-free soldering frit material.

Figure 4B:
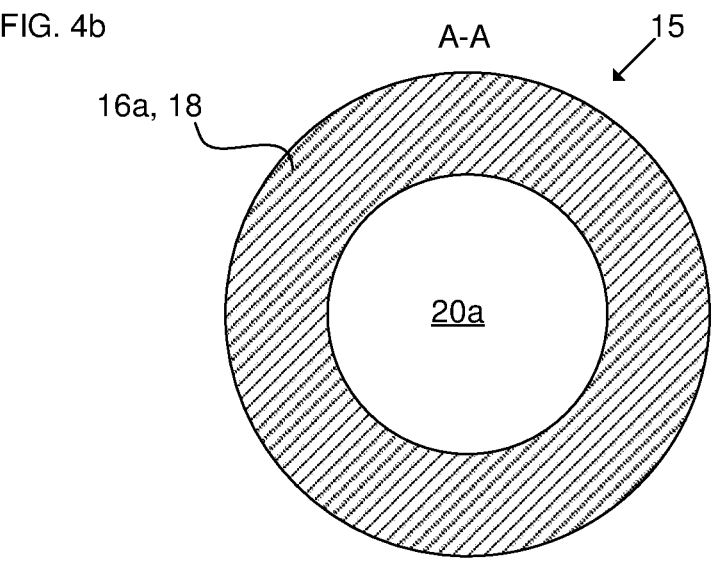

FIG. 4a shows a gasket adapted in lateral extend and shape to an evacuation cup 9 comprising a single first cavity 10 and a first cavity opening 10a. In FIG. 4b, the gasket 15 is viewed from a direction perpendicular to the sealing surfaces 16a, 16b of the gasket 15 at the cross-section along the A-A line as shown in FIG. 4a. The shape of the gasket 15 is adapted to correspond to the pattern created by the contact surfaces 13a, 13b of the evacuation cup 9 as viewed from a direction perpendicular to the contact surfaces 13a, 13b e.g. from below. The gasket comprises a single ring-shaped region 18 and centred gasket opening 20a, corresponding in shape to the first cavity opening 10a.

Figure 5B:
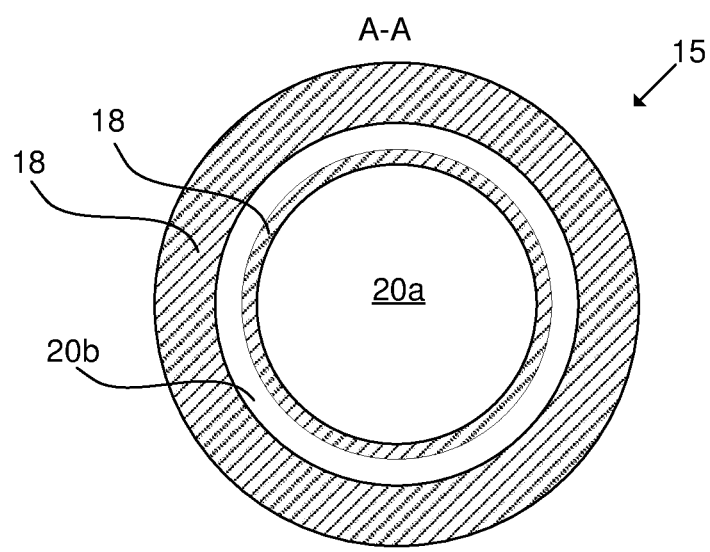

An expanded view of the interface between a gasket 15 and an evacuation cup 9 and a first glass pane 2a of a VIG unit 1 is shown in FIG. 5a. FIG. 5b shows a cross-section of the gasket along the line A-A as indicated in FIG. 5a. The gasket 15, which is adapted to match the evacuation cup 9, comprising two cavities 10, 11 and correspondingly two cavity openings 10a, 11a, has a central opening 20a and two concentric ring-shaped gasket regions 18 with an annular opening 20b in between. As the gasket openings 20a, 20b are aligned with the cavity openings 10a, 11a, the first cavity 10 may be in fluid connection with the surface of the first glass pane 2a', the evacuation opening 4 and the void 3 via the central opening 20a when the evacuation cup 9 and gasket 15 is arranged on the VIG unit 1. Additionally, the second cavity 11 may be in fluid connection with the first glass pane surface 2a', via the annular opening 20b when the evacuation cup 9 and the gasket 15 are arranged on the VIG unit 1.

Figure 5C:
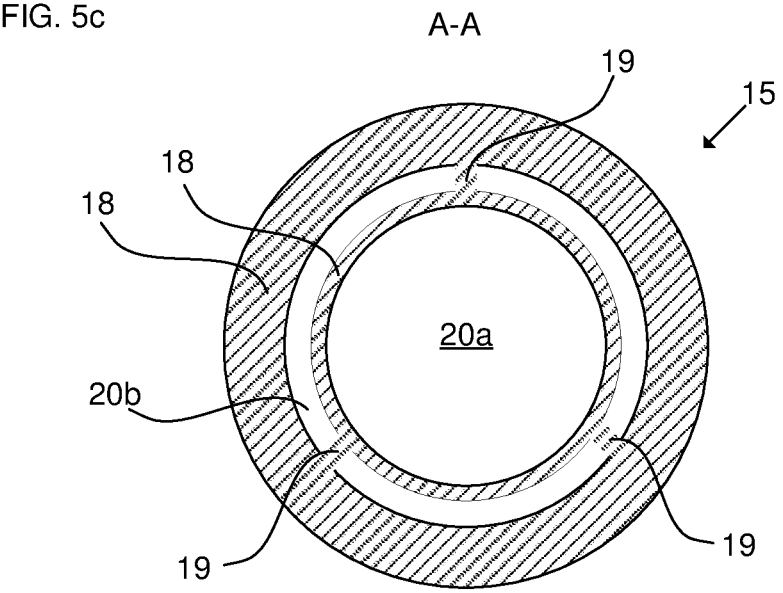

In order for the gasket 15 to be easier to manoeuvre, the annular opening 20b may not extend all the way around the central opening 20a but instead be separated by bridge regions 19 into two or more openings as shown in FIG. 5c. The bridge regions 19 are themselves made of the gasket material 15'.

Figure 5D:
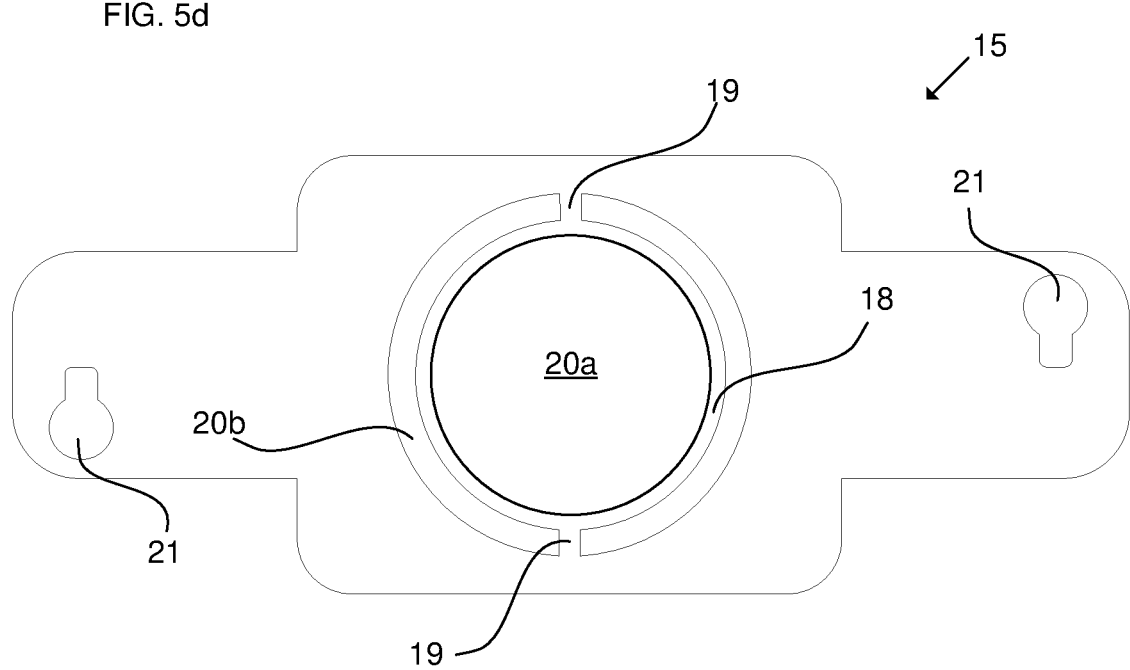
FIG. 5d shows a gasket with positioning apertures. The gasket is viewed along a direction perpendicularly to the sealing surfaces.

FIG. 5d shows a gasket 15 having a central opening 20a and an annular opening 20b separated by bridge regions 19 and a ring-shaped region 18. The gasket 15 further comprises two flange regions on two opposite sides of the central opening 20a. Each flange region comprises a positioning aperture 21 adapted to facilitate a correct positioning of the gasket 15 relative to the evacuation cup 9 it is to be used with. In the present example, the positioning aperture 21 is of a keyhole shape which is configured to be interconnected with a protrusion on the evacuation cup 9.

In one or more examples, an apparatus 8 for evacuation a void in a VIG unit is defined as comprising an evacuation cup and a gasket according to the present invention.

In one or more examples, the evacuation cup 9 comprises a first heat source 22 adapted to heat the first cavity 10 of the evacuation cup 9 to a temperature different or equal to the temperature within the furnace 26. In FIGS. 6a and 6b the first heat source 22 comprises one or more heat cartridges embedded in the evacuation cup body 12, which is adapted to heat the first cavity 10 via the cup body 12. In an example shown in FIG. 6a, a top frit material 7a is arranged around the evacuation opening 4 of the first glass pane 2a, and comprising a central opening. The first heat source 22 is in the present example configured to provide the necessary heat for the top frit material 7a to enter a flowing state and close off central opening in the frit material and thereby the evacuation opening 4 at pressures from atmospheric to vacuum pressures.

In one or more examples, the top frit material 7a surrounds a glass tube 24 which provides a pathway for the gas between the void 3 and the first cavity 10, as illustrated in FIG. 6b. The top frit soldering material 7a is heat-treated by the furnace 26 or the first heat source 22 in order to create a hermetic seal between the tube 24 and the first glass pane 2a. The seal is obtained prior to evacuation of the void 3 such that gas is evacuated through the tube 24 only. After evacuation of the void 3 the evacuation opening 4 is closed by closing the glass tube 24 by means of the first heat source 22 or a different second heat source 23. In the present example a second heat source 24 is comprised in the first cavity 10. In an example, the second heat source 23 comprises a coil heater, such as a tungsten coil suitable for heating the tip of the tube 24 to approximately 900-1200 degrees Celsius for 10-30 seconds and thereby close it.

As shown in FIGS. 6a and 6b, according to the method for the production of a VIG unit 1, the VIG unit 1 is arranged with an evacuation cup 9 and a gasket 15 according to one or more examples of the invention on top of the VIG unit 1 covering the evacuation opening 4 provided in the first glass pane 2a of the VIG unit 1. A top frit material 7a is arranged around the evacuation opening 4 and a side frit material 6a is arranged between the two glass panes 2a, 2b along the periphery of the panes 2a, 2b. The evacuation cup 9 of the present invention has one interior first cavity 10 enclosed by the evacuation cup body 12 and the first cavity opening 10a. The evacuation cup 9 is placed on the VIG unit 1 with a gasket 15 in between such that the contact surfaces 13a, 13b of the evacuation cup 9 is opposing with the first glass pane 2a and such that they are in connection via a gasket 15. The first cavity 10 of the evacuation cup 9 is in fluid connection with a pump 25 and the void 3 of the VIG unit 1 such that the VIG unit 1 can be evacuated using the pump 25.

The evacuation cup 9 and the gasket 15 within the apparatus may be placed on the VIG unit 1 simultaneously or separately. The gasket 15 does not need to be attached to the evacuation cup 9 prior to placing the apparatus 8 on the VIG unit 1.

The VIG unit 1 and the apparatus 8 for evacuation of the VIG unit 1 comprising a gasket 15 and an evacuation cup 9, is placed in a furnace 26, where the whole arrangement is heated by means of at least the furnace 26. There may exist additional heat sources in the furnace 26 directed towards the evacuation cup 9.

The VIG unit 1 and apparatus 8 is heated to a temperature allowing the side frit material 6a and top frit material 7a to sinter and solder to the appointed surfaces facilitating hermetic seals. The temperature in the furnace 26 may be gradually increased and then maintained at a softening temperature (Ts) for a period of time long enough for the soldering materials 6a, 7a to create seals. In an example the softening temperature (Ts) may be maintained for 10-40 min. at 350 degrees Celsius.

In one or more aspect of the present examples of the method, the evacuation cup 9 comprises a first heat source 22 for heating at least the first cavity 10 of the cup 9 and also the top frit material 7a around the evacuation opening 4. In the present example shown in FIGS. 6a and 6b, the first heat source 22 is configured to heat the top frit material 7a to a heat treatment temperature (Th) which is larger than the temperature of the air surrounding the outside the evacuation cup 9. In one or more examples, the top frit material 7a is heated to a temperature which is 20-50 degrees Celsius higher than the temperature at which the top frit material 7a will flow, or the temperature of 420 degrees Celsius. The top frit material 7a around the evacuation opening 4 is heat-treated separately from the side frit material 6a, as the heat treatment of the top frit material 7a is done locally, near the evacuation cup 9. The additional heat applied to the top frit material 7a compared to the side frit material 6a, generates a more rigid and thermally stable frit seal. The first heat source 22 may comprise heat cartridges 22 in shape of rods placed in the evacuation cup body 12. By heating the evacuation body 12 an increase in temperature of the portion enclosed by the cup 9 is correspondingly increased such that specifically the top frit material 7a around the evacuation opening 4 is heated to a larger temperature than the temperature provided by the furnace 26 alone (see FIG. 7). Generally, by optimum placement of the first heat source 22 e.g. at an optimum height from the first glass pane 2a, the heat generated heat is be mainly focused on the top frit material 7a, such that e.g. the first glass pane 2a covered by the first cavity 10 of the evacuation cup 9 is only minimally affected by heat.

The soldering frit materials 6a, 7a are allowed to settle by lowering the temperature in the furnace 26 towards a curing temperature (Tcure). The evacuation process may be initiated when the viscosity of especially the side frit material 6a is low enough to be deformed as the panes 2a, 2b will move towards each other but high enough to remain at the appointed inner glass surfaces 2a", 2b". The evacuation process is in the present invention may therefore be initiated at the suitable viscosity while the temperature is still decreasing. Alternatively, the evacuation process may be initiated when the viscosity of especially the side frit material 6a is at a level where it may only be deformed by applying a pressure to the opposing panes 2a, 2b. The temperature provided by the furnace 26 during evacuation is at least 275 degrees Celsius such that any contaminants may be efficiently vaporized and pumped out from the VIG unit void 3 in order to provide an optimal thermal cleaning process of the VIG unit 1 during the evacuation of the void 3.

The evacuation of the first cavity 10 through a conduit connecting the first exhaust opening 14a to a pump 25, creates a low pressure within the cavity 10 resulting in a compressive force from the atmospheric pressure surrounding the cup 9 on to the first cavity 10 and thereby the VIG unit void 3. This compressive load forces the evacuation cup 9 towards the glass pane 2a and thereby compresses the gasket 15 situated in between. The softness and flexibility of the gasket 15 allows the gasket 15 to deform to the surface roughness of the abutting contact surfaces 13a, 13b and first glass pane surfaces 2a' such that an optimum seal is provided between these surfaces 2a', 13a, 13b and so that the void 3 may be evacuated more efficiently. The gasket 15 is additionally provided with an aluminium coating layer 17 in both sealing surfaces 16a, 16b of the gasket 15 which under compression and heating efficiently fills any minor inconsistencies and cracks in the contact surfaces 13a, 13b and/or the first glass pane surface 2a' abutting the gasket 15. The aluminium coating layer 17 may in another example be doped with Silicon such that the coating layer 17 flows at lower temperatures. After a sufficient pressure is obtained, at least $10^{-3}$ mbar, within the VIG unit void 3, the evacuation opening 4 is sealed and the void 3 is now fully enclosed.

In FIG. 6b the evacuation cup 9 has a second cavity 11 within the evacuation body 12 and having a second cavity opening 11a in the same plane as the first cavity opening 10a. The second cavity opening 11a is surrounding the first cavity opening 10a but separated by the first contact surface 13a. A second contact surface 13b is defined between the second cavity opening 11a and an outer rim on the outside of the evacuation cup 9 as shown. The second contact surface 13b and the first contact surface 13a are both abutting the gasket 15 and facing the first glass pane 2a. The second cavity 11 is connected to a second exhaust opening 14b and to a pump 25.

In the initial stages of the evacuation process, the pump 25 connected to the second cavity 11 may be started such that a low pressure is created within the second cavity 11. This will fix the evacuation cup 9 on to the VIG unit 1 as the evacuation cup 9 and the glass pane 2a will be forced towards each other. The pressure in the second cavity 11 is around $10^{-1}$ mbar. During the evacuation process as both cavities 10, 11 are evacuated, any leaks of gas entering the second cavity 11 from the outside of the cup 9 may be evacuated prior to reaching the first cavity 10.

In an example shown in FIG. 6a, top frit material 7a is melted after the necessary pressure is obtained in the void 3 and the top frit material 7a flows into the evacuation opening 4 and blocks it in order to seal the void 3 from the surroundings. In another example, shown in FIG. 6b, the top frit material 7a is placed around an evacuation member 24 in form of a hollow tube in the evacuation opening 4. By heat treatment of the top frit material 7a a rigid top seal is created between the evacuation opening 4 and the tube 24, and the void 3 is evacuated through the evacuation tube 24 only. After the evacuation of the void 3 is finalised the tube 24 is sealed by appropriate ways, such as by clamping the tip of the tube 24 or by melting the tip of the tube 24. In an example, the evacuation cup 9 comprises a second heat source 23 for sealing the tip of the tube 24. The heat source is a coil heater 23 which is movable in a direction towards and away from the tip of the tube 24 along an axis extending outwards from the evacuation opening 4. The tip of the tube 24 is heated to approximately 900-1200 degrees Celsius, the heat directed towards the tip of the tube 24 only minimally affects the top frit seal, and the integrity of the top seal is maintained. Local heating is applied far from the side seal, and the side seal is maintained.

Figure 7:
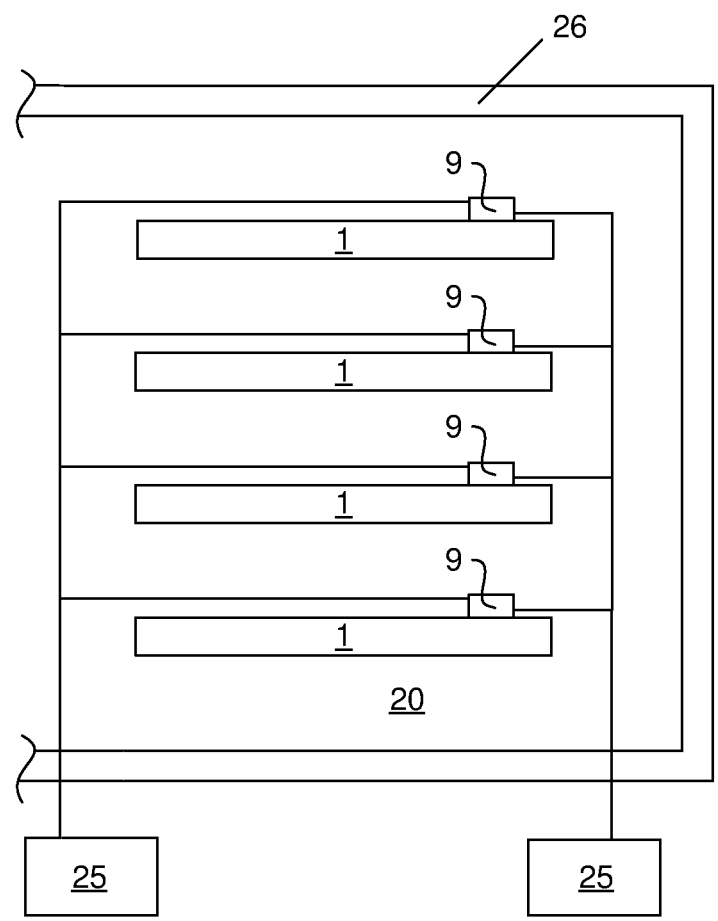
FIG. 7 shows a cross-sectional view of a plurality of VIG units in a furnace each arranged with apparatus comprising an evacuation cup and a gasket.

In an aspect of the invention, multiple VIG units 1 are produced substantially simultaneously in a furnace 26 as illustrated in FIG. 7. The first cavity 10 and/or the second cavity 11 are in fluid communication with one or more pumps 25. In the present example the first cavity 10 is in fluid connection with a turbomolecular pump 25 while the second cavity is in fluid connection with a rotary pump 25.

Figure 8:
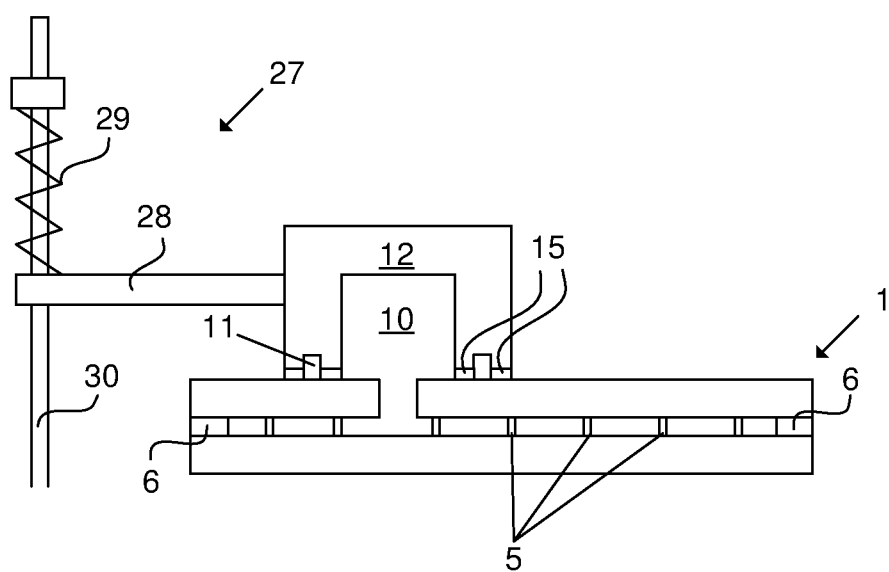
FIG. 8 shows a side view of a part of a VIG unit arranged with a gasket, an evacuation cup and a displacement tool

In one or more aspects of the invention, the evacuation cup 9 may be in connection with a displacement tool 27 as shown in FIG. 8. FIG. 8 shows a side view of a part of a VIG unit 1 arranged with a gasket 15, an evacuation cup 9 and a displacement tool 27. The displacement tool 27 in the present example, comprises an arm 28 for connecting to the evacuation cup 9 at one end and at the other end for connecting with a spring 29. The arm 28 is movable in a direction substantially perpendicular to the major surfaces of the glass panes 2a, 2b, e.g. the arm 28 may be slidable along a guidance rod 30. The connection between the arm 28 and the evacuation cup 9 may be any suitable connection, such that a movement of the arm 28 in turn causes a movement of the evacuation cup 9. The arm 28 may move in either directions along the guiding rod 30. A downward movement of the arm 28, towards the VIG unit 1, may cause a compression of the gasket 15, or provide to secure the gasket 15 in place. An upward movement may partially or fully release any pressure on the gasket 15 caused by the arm 28. In one or more examples, the spring may be selectively activated such that the evacuation cup 9 only presses onto the gasket 15 during specific parts of the VIG unit manufacturing process. In one or more examples, the VIG unit 1 rest on a support structure, which maintains its position during activation of the displacement tool. Preferably, when the displacement tool 27 is activated the gasket 15 is experiences a compressive force in a direction mainly perpendicular to the sealing surfaces 16a, 16b of the gasket 15.

REFERENCES

1 Vacuum insulated glazing unit
2a First tempered glass pane
2a' Outer surface of the first glass pane
2a" Inner surface of the first glass pane
2b Second tempered glass pane
2b' Outer surface of the first glass pane
2b" Inner surface of the first glass pane
3 Void
4 Evacuation opening
5 Spacers
6 Side sealing material
6a Side frit material
7 Top sealing material
7a Top frit material
8 Apparatus
9 Evacuation cup
10 First cavity
10a First cavity opening
11 Second cavity
11a Second cavity opening
12 Evacuation cup body
13a First contact surface
13b Second contact surface
14a First exhaust opening
14b Second exhaust opening
15 Gasket
15' Gasket material
16a First sealing surface
16b Second sealing surface
17 Coating layer e.g. aluminium
18 Ring-shaped regions
19 Bridge regions
20a Centred gasket opening
20b Annular gasket opening
21 Positioning aperture
22 First heat source, e.g. heat cartridges
23 Second heat source, e.g. coil heater
24 Evacuation member, e.g. tube
25 Pump
26 Furnace
27 Displacement tool
Ts Softening temperature
Th Heat treatment temperature
Tcure Curing temperature

The invention claimed is:

1. Method for evacuating a void between two glass panes in the production of a vacuum insulated glazing unit, wherein the vacuum insulated glazing unit comprises:

a first tempered glass pane and a second tempered glass pane arranged in parallel, the first glass pane and the second glass pane each having an inner surface and an outer surface, the inner surfaces opposing each other;
spacers arranged between the opposed inner surfaces;
a side sealing material peripherally arranged between the first glass pane and the second glass pane creating an internal void between the glass panes, and
an evacuation opening in the first glass pane, the evacuation opening allowing for the internal void to be evacuated there through,
the method comprising:
positioning a gasket between an evacuation cup and the outer surface of the first pane, wherein the evacuation cup comprises: a first cavity with a first cavity opening; an exhaust opening for evacuating the void via the first cavity opening; an evacuation cup body surrounding the first cavity; and one or more contact surfaces including a first contact surface enclosing the first cavity opening,
covering the evacuation opening in the first glass pane and a part of the outer surface on the first glass pane surrounding the evacuation opening with the evacuation cup, and
directly contacting a first sealing surface of the gasket with the one or more contact surfaces of the evacuation cup and directly contacting a second sealing surface of the gasket, opposite form the first sealing surface, with the first glass pane, the gasket providing an air tight seal between the one or more contact surfaces of the evacuation cup and the first glass pane,
wherein the gasket comprises a gasket material, which:
constitutes a majority of the gasket,
is compressible between the evacuation cup and outer surface of the first pane with an out of plane module of elasticity below 50 GPa, and
has a melting temperature above 400 degrees Celsius.

2. Apparatus for evacuating a void between two glass panes in the production of a vacuum insulated glazing unit, the vacuum insulated glazing unit comprising:
a first tempered glass pane and a second tempered glass pane arranged in parallel, the first glass pane and the second glass pane each having an inner surface and an outer surface, the inner surfaces opposing each other;
spacers arranged between the opposed inner surfaces;
a side sealing material peripherally arranged between the first glass pane and the second glass pane creating an internal void between the glass panes, and
an evacuation opening in the first glass pane, the evacuation opening allowing for the internal void to be evacuated there through,
wherein the apparatus comprises:
an evacuation cup comprising:
a first cavity with a first cavity opening;
an exhaust opening for evacuating the void via the first cavity opening;
an evacuation cup body surrounding the first cavity; and
one or more contact surfaces including a first contact surface on the evacuation cup body enclosing the first cavity opening,
the evacuation cup being adapted for covering the evacuation opening in the first glass pane and a part of the outer surface on the first glass pane surrounding the evacuation opening, and
a gasket comprising a first sealing surface and a second sealing surface opposite the first sealing surface,
wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane,
wherein the gasket comprises a gasket material, which:
constitutes a majority of the gasket,
is compressible between the evacuation cup and outer surface of the first pane with an out of plane module of elasticity below 50 GPa, and
has a melting temperature above 400 degrees Celsius.

3. Method according to claim 1, wherein the gasket material is graphite with a purity of the graphite material being above 97%.

4. Method according to claim 1, wherein the the first sealing surface and/or the second sealing surface comprises a coating layer.

5. Method according to claim 4, wherein the coating layer is an aluminium layer.

6. Method according to claim 4, wherein the coating layer(s) has a thickness below 5 microns.

7. Method according to claim 1, wherein the gasket has a thickness being:
at least twice of that of an out of flatness of the outer surface of the first glass pane, and/or
between 0.6-2 millimetres,
wherein the gasket has a variation in thickness across the gasket surface of less than 100 microns.

8. Method according to claim 1, wherein the gasket has a circular shape, and wherein the gasket is absent of a center section allowing the void to be evacuated through the first cavity opening of the evacuation cup.

9. Method according to claim 1, wherein the gasket comprises two concentric ring shaped regions separated by a ring shaped gasket opening, wherein the two concentric ring shaped regions are interconnected by at least one bridge region, and wherein the gasket comprises two, three, four, or five bridge regions bridging the two concentric ring shaped regions.

10. Apparatus according to claim 2, wherein the first cavity opening of the evacuation cup is positioned in a center of the evacuation cup, and wherein the evacuation cup comprises a second cavity in the evacuation body, the second cavity having a second cavity opening concentric with the first cavity opening, the second cavity opening positioned between the first contact surface of the evacuation cup and a second contact surface of the evacuation cup, the evacuation cup further comprising a second exhaust opening for evacuating the second cavity.

11. Apparatus according to claim 10, wherein a ring shaped gasket opening allows a second void defined by the second cavity and the outer surface on the first glass pane to be evacuated through the second exhaust opening.

12. Apparatus according to claim 2, wherein the one or more contact surfaces is substantially parallel with the outer surface of the first glass pane when the evacuation cup is positioned on the outer surface of the first glass pane, and/or wherein the one or more contact surfaces has a width between 0.50-1 mm.

13. Apparatus according to claim 2, wherein the evacuation cup comprises a first heat source for heating the first cavity.

14. Apparatus according to claim 13, wherein the evacuation cup further comprises a second heat source.

15. Apparatus according to claim 2, wherein the evacuation cup is arranged to be connectable to a displacement tool for displacing said evacuation cup towards said gasket, or wherein the apparatus comprises a displacement tool for displacing said evacuation cup towards said gasket.

16. Method for producing a vacuum insulated glazing unit, the vacuum insulated glazing unit comprising:
    a first tempered glass pane and a second tempered glass pane arranged in parallel, the first glass pane and the second glass pane each having an inner surface and an outer surface, the inner surfaces opposing each other;
    spacers arranged between the opposed inner surfaces;
    a side sealing material in the form of a side frit material peripherally arranged between the first glass pane and the second glass pane creating an internal void between the glass panes;
    an evacuation opening in the first glass pane, the evacuation opening allowing for the internal void to be evacuated there through, and
    a top frit material arranged around the evacuation opening,
    wherein the method comprises the steps of:
        placing a gasket and an evacuation cup for evacuating a void between two glass panes in the production of the vacuum insulated glazing unit over the evacuation opening, covering a portion comprising at least the evacuation opening and the top frit material, wherein the evacuation cup comprises:
            a first cavity with a first cavity opening;
            an exhaust opening for evacuating the void via the first cavity opening;
            an evacuation cup body surrounding the first cavity; and
            one or more contact surfaces including a first contact surface enclosing the first cavity opening,
                the evacuation cup being adapted for covering the evacuation opening in the first glass pane and a part of the outer surface on the first glass pane surrounding the evacuation opening, and
            wherein the gasket comprises:
                a first sealing surface and a second sealing surface opposite the first sealing surface, wherein the gasket is adapted for being positioned between the evacuation cup and the outer surface of the first pane with the first sealing surface in direct contact with the one or more contact surfaces of the evacuation cup and the second sealing surface in direct contact with the first glass pane, the gasket providing an air tight seal between the one or more contact surfaces of the evacuation cup and the first glass pane,
            wherein the gasket comprises a gasket material, which:
                constitutes a majority of the gasket,
                is compressible between the evacuation cup and the outer surface of the first pane with an out of plane module of elasticity below 50 GPa, and
                has a melting temperature above 400 degrees Celsius,
        placing the vacuum insulated glazing unit with the evacuation cup and the gasket in a furnace;
        heating the side frit material and the top frit material by at least the furnace;
        lowering the temperature of the top frit material and the side frit material towards a curing temperature (Tcure);
        evacuating the void using a pump connected to the exhaust opening in the evacuation cup, and
        sealing the evacuation opening, so as to prevent gas from transferring between the void and the outside of the glass panes and thereby obtaining the vacuum insulated glazing unit.

17. Method according to claim 16, wherein in the step of heating the side frit material and the top frit material by at least the furnace:
    the side frit material is heated to a softening temperature (Ts), and
    the top frit material is heated to a heat treatment temperature (Th) by means of a first heat source of the evacuation cup, wherein the heat treatment temperature (Th) is larger than the softening temperature (Ts) by at least 5 degrees Celsius.

18. Method according to claim 17 further comprising the step of maintaining the heat treatment temperature (Th) of the top frit material and the softening temperature (Ts) of the side frit material for at least 3 min, wherein the top frit material is made of lead-free solder frit material.

19. Method according to claim 16, wherein the vacuum insulated glazing unit further comprises an evacuation member in the evacuation opening, the evacuation member being a hollow tube, through which evacuation member the internal void can be evacuated.

20. Method according to claim 16, wherein the evacuation cup is adapted to be displaced towards said gasket by a displacement tool, and wherein the method comprises the step of applying a compressive force to said gasket by said displacement tool via said evacuation cup.

\* \* \* \* \*